United States Patent
Edge et al.

(10) Patent No.: US 11,382,058 B2
(45) Date of Patent: Jul. 5, 2022

(54) SYSTEMS AND METHODS FOR LOCATION BY A MOBILE DEVICE IN A FIFTH GENERATION WIRELESS NETWORK

(71) Applicant: QUALCOMM Incorporated, San Diego, CA (US)

(72) Inventors: Stephen William Edge, Escondido, CA (US); Sven Fischer, Nuremberg (DE); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 16/788,188

(22) Filed: Feb. 11, 2020

(65) Prior Publication Data

US 2020/0267683 A1   Aug. 20, 2020

Related U.S. Application Data

(60) Provisional application No. 62/805,891, filed on Feb. 14, 2019.

(51) Int. Cl.
*H04W 4/029* (2018.01)
*H04W 64/00* (2009.01)
(Continued)

(52) U.S. Cl.
CPC ......... *H04W 64/003* (2013.01); *H04L 5/0048* (2013.01); *H04L 47/283* (2013.01);
(Continued)

(58) Field of Classification Search
CPC ..... H04W 4/029; H04W 4/80; H04W 64/003; H04W 12/03; H04W 12/037;
(Continued)

(56) References Cited

U.S. PATENT DOCUMENTS

2003/0091009 A1* 5/2003 Halivaara ............ H04B 1/7075
370/335
2004/0259565 A1* 12/2004 Lucidarme ............ H04W 16/18
455/453

(Continued)

FOREIGN PATENT DOCUMENTS

WO   WO-2019027539 A1   2/2019

OTHER PUBLICATIONS

International Search Report and Written Opinion—PCT/US2020/017943—ISA/EPO—dated May 28, 2020.

(Continued)

*Primary Examiner* — Joseph Arevalo
(74) *Attorney, Agent, or Firm* — Qualcomm Incorporated

(57) ABSTRACT

A user equipment (UE) periodically obtains its location using UE based Observed Time Difference of Arrival (OTDOA). The location is based on Reference Signal Time Differences (RSTDs) measured by the UE for downlink (DL) signals transmitted by each of a plurality of base stations, and the most current Real Time Differences (RTDs) for pairs of base stations. The RTDs may be determined by the UE using the RSTD measurements and Round Trip Time (RTT) measurements determined by a network entity or by the UE. The RTDs may be determined less frequently than the UE location to reduce network and UE load. Location of the UE may be improved based on testing a rate of change for each of the RTDs. The RTD determination may be improved using measurements from a plurality of UEs.

44 Claims, 10 Drawing Sheets

(51) Int. Cl.
*H04L 5/00* (2006.01)
*H04W 24/10* (2009.01)
*H04W 72/04* (2009.01)
*H04L 47/283* (2022.01)

(52) U.S. Cl.
CPC ........... *H04W 4/029* (2018.02); *H04W 24/10* (2013.01); *H04W 72/042* (2013.01); *H04W 72/0413* (2013.01)

(58) Field of Classification Search
CPC ..... H04W 12/0431; H04W 4/02; H04W 4/12; H04W 4/20; H04W 4/70; H04W 72/048; H04W 72/085; H04W 24/10; H04W 64/00; H04W 72/0413; H04W 72/042
USPC .......... 370/329, 315, 338, 252, 395.42, 458, 370/356, 318, 316, 515
See application file for complete search history.

(56) References Cited

U.S. PATENT DOCUMENTS

| | | | | |
|---|---|---|---|---|
| 2010/0323723 | A1* | 12/2010 | Gerstenberger | G01S 5/0242 455/456.5 |
| 2011/0077030 | A1* | 3/2011 | Wigren | H04W 64/00 455/456.5 |
| 2012/0009939 | A1* | 1/2012 | Islam | G01S 5/06 455/456.1 |
| 2012/0009949 | A1* | 1/2012 | Islam | H04W 64/00 455/456.6 |
| 2012/0009950 | A1* | 1/2012 | Islam | H04W 64/00 455/456.6 |
| 2012/0127890 | A1* | 5/2012 | Islam | G01S 13/767 370/252 |
| 2012/0129550 | A1* | 5/2012 | Hannan | H04W 64/00 455/456.1 |
| 2012/0163222 | A1* | 6/2012 | Islam | G01S 13/767 370/252 |
| 2013/0109405 | A1* | 5/2013 | Siomina | G01S 5/017 455/456.1 |
| 2013/0252629 | A1* | 9/2013 | Wigren | H04W 64/00 455/456.1 |
| 2017/0279487 | A1* | 9/2017 | Kazmi | H04W 48/00 |
| 2018/0299561 | A1* | 10/2018 | Jau | G01S 19/256 |
| 2020/0367193 | A1* | 11/2020 | Cha | H04W 76/11 |

OTHER PUBLICATIONS

QUALCOMM Incorporated: "Introduction of UE-Based OTDOA Positioning", 3GPP Draft, 3GPP TSG-RAN WG2 Meeting #102 R2-1808105_(UE-BASED OTDOA), 3rd Generation Partnership Project (3GPP), Mobile Competence Centre, 650, Route Des Lucioles, F-06921, Sophia-Antipolis Cedex, France, vol. RAN WG2, No. Busan, Korea; May 21, 2018-May 25, 2018, May 20, 2018 (May 20, 2018), XP051444424, 10 pages, Retrieved from the Internet:URL:http://www.3gpp.org/ftp/Meetings%5F3GPP%5FSYNC/RAN2/Docs/ [retrieved on May 20, 2018] paragraph [0002]—paragraph [0003].
QUALCOMM Incorporated: "RAT—Dependent DL—only NR Positioning Techniques", 3GPP Draft, 3GPP TSG-RAN WG1 Meeting AH1901, R1-1900914, RAT—dependent DL—only NR Positioning Techniques, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019- Jan. 25, 2019, Jan. 20, 2019 (Jan. 20, 2019), XP051593760, 11 pages, Retrieved from the Internet: URL:http://www.3gpp.org/ftp/Meetings%5F3GPP%5FSYNC/RAN1/Docs/R1%2D1900914%2Ezip [retrieved on Jan. 20, 2019], paragraph [0002].

* cited by examiner

Let δ = Time at E2 - Time at E1

RTT = A + B
    = (Rx0 − Tx0 − δ) + (Rx1 + δ − Tx1)
    = (Rx1 − Tx0) + (Rx0 − Tx1)

Denoting (T mod 1ms) as [T] and assuming RTT < 1ms

RTT = [ RTT ]
    = [ (Rx1 − Tx0) + (Rx0 − Tx1) ]
    = [ [(Rx1 − Tx0)] + [(Rx0 − Tx1)] ]
    = [ Rx-Tx$_{E1}$ + Rx-Tx$_{E2}$ ]    Eq. (420)

Where  Rx-Tx$_{E1}$ = [ Rx1 − Tx0 ]
And    Rx-Tx$_{E2}$ = [ Rx0 − Tx1 ]

For RTT calculation by E1 using Eq 420, E1 needs to be provided with Rx-Tx$_{E2}$ and to measure Rx-Tx$_{E1}$

SYSTEMS AND METHODS FOR LOCATION BY A MOBILE DEVICE IN A FIFTH GENERATION WIRELESS NETWORK

CROSS-REFERENCE TO RELATED APPLICATIONS

This application claims the benefit of U.S. Provisional Application No. 62/805,891, entitled "SYSTEMS AND METHODS FOR LOCATION USING OTDOA BY A MOBILE DEVICE IN A FIFTH GENERATION WIRELESS NETWORK," filed Feb. 14, 2019, which is assigned to the assignee hereof and which is expressly incorporated herein by reference in its entirety.

BACKGROUND

Background Field

The present disclosure relates generally to communication, and more specifically to techniques for supporting location services for user equipments (UEs).

Relevant Background

It is often desirable for a mobile device, such as a cellular phone, to be capable of determining its own location. For example, the location may be sent to a location services (LCS) client which needs to know the location of the mobile device (e.g., in the case of an emergency services call or to provide some service to the user of the mobile device such as navigation assistance or direction finding). In addition, a mobile device may use knowledge of its location to provide services to a user of the mobile device (e.g., navigation assistance), to applications operating on the mobile device or to an external client. For example, a mobile device may use the location of the mobile device to determine whether a trigger event has occurred (such as the mobile device moving into or out of a geofence area) and, when detecting such a trigger event, may send a report and possibly the location of the mobile device to an external client. Note that the terms "location", "location estimate", "position", "position estimate" and "position fix" are treated as being synonymous and are used interchangeably herein.

For some applications, it may be useful or essential for a mobile device to obtain its own location with low latency and in the absence of support from a Global Navigation Satellite System (GNSS) such as GPS, GLONASS or Galileo. For example, this may apply for a mobile device that is indoors or in a dense urban canyon when tracking of the mobile device is needed for such applications as navigation assistance, public safety support or management of moving objects in a factory or warehouse. In such cases, a non-GNSS means of reliably and quickly locating a mobile device by the mobile device may be of value.

SUMMARY

Periodic location determination of a user equipment (UE) is performed using UE based Observed Time Difference of Arrival (OTDOA). The UE based OTDOA uses Reference Signal Time Differences (RSTDs) measured by the UE for downlink (DL) signals transmitted by each of a plurality of base stations, and the most current Real Time Differences (RTDs) determined for pairs of base stations. The RTDs are determined by the UE using Round Trip Time (RTT) measurements, which may be determined by a location server or the UE. The determination of RTD may be performed less frequently than the UE based OTDOA location determination to reduce network load. The rate of change of the RTDs may be tested to ensure that the OTDOA location determination may accurately rely on the RTDs, which are updated less frequently than the OTDOA location determination. The RTT measurements may be determined using measurements from a plurality of UEs.

In one implementation, a method for locating a user equipment (UE) performed by the UE, includes measuring Reference Signal Time Differences (RSTDs) at a first periodic interval for a plurality of base stations in a Radio Access Network (RAN); receiving location information from a network entity at a second periodic interval; obtaining Round Trip Time (RTT) measurements for the plurality of base stations at the second periodic interval, based on the location information received from the network entity; determining Real Time Differences (RTDs) at the second periodic interval for pairs of base stations in the plurality of base stations based on the measured RSTDs and the RTT measurements; and determining a location of the UE at the first periodic interval using Observed Time Difference of Arrival (OTDOA) based on the RSTDs and most recent RTDs, wherein the first periodic interval is shorter than the second periodic interval.

In one implementation, a user equipment (UE) capable of performing location determination of the UE, includes a wireless transceiver configured to wirelessly communicate with base stations in a Radio Access Network (RAN); at least one memory; at least one processor coupled to the wireless transceiver and the at least one memory, wherein the at least one processor is configured to: measure Reference Signal Time Differences (RSTDs) at a first periodic interval of signals received via the wireless transceiver from a plurality of base stations in the Radio Access Network (RAN); receive, via the wireless transceiver, location information from a network entity at a second periodic interval; obtain Round Trip Time (RTT) measurements for the plurality of base stations at the second periodic interval, based on the location information received from the network entity; determine Real Time Differences (RTDs) at the second periodic interval for pairs of base stations in the plurality of base stations based on the measured RSTDs and the RTT measurements; and determine a location of the UE at the first periodic interval using Observed Time Difference of Arrival (OTDOA) based on the RSTDs and most recent RTDs, wherein the first periodic interval is shorter than the second periodic interval.

In one implementation, a user equipment (UE) capable of performing location determination of the UE, includes means for measuring Reference Signal Time Differences (RSTDs) at a first periodic interval for a plurality of base stations in a Radio Access Network (RAN); means for receiving location information from a network entity at a second periodic interval; means for obtaining Round Trip Time (RTT) measurements for the plurality of base stations at the second periodic interval, based on the location information received from the network entity; means for determining Real Time Differences (RTDs) at the second periodic interval for pairs of base stations in the plurality of base stations based on the measured RSTDs and the RTT measurements; and means for determining a location of the UE at the first periodic interval using Observed Time Difference of Arrival (OTDOA) based on the RSTDs and most recent RTDs, wherein the first periodic interval is shorter than the second periodic interval.

In one implementation, a non-transitory storage medium including program code stored thereon, the program code is operable to cause at least one processor in a user equipment (UE) to perform location determination for the UE, includes program code to measure Reference Signal Time Differences (RSTDs) at a first periodic interval for a plurality of base stations in a Radio Access Network (RAN); program code to receive location information from a network entity at a second periodic interval; program code to obtain Round Trip Time (RTT) measurements for the plurality of base stations at the second periodic interval, based on the location information received from the network entity; program code to determine Real Time Differences (RTDs) at the second periodic interval for pairs of base stations in the plurality of base stations based on the measured RSTDs and the RTT measurements; and program code to determine a location of the UE at the first periodic interval using Observed Time Difference of Arrival (OTDOA) based on the RSTDs and most recent RTDs, wherein the first periodic interval is shorter than the second periodic interval.

In one implementation, a method performed by a network entity for supporting location of a user equipment (UE) at a first periodic interval, includes sending to the UE a first request to transmit UL signals at a second periodic interval to a plurality of base stations in a Radio Access Network (RAN), wherein the second periodic interval is longer than the first periodic interval; sending to each of the plurality of base stations a second request to provide uplink (UL) Receive Time-Transmission Time (Rx-Tx) measurements at the second periodic interval of the UL signals transmitted by the UE; receiving the UL Rx-Tx measurements of the UL signals from each of the plurality of base stations at the second periodic interval; determining location information based on the UL Rx-Tx measurements; and sending the location information to the UE at the second periodic interval, wherein the location information enables the UE to determine Real Time Differences (RTDs) at the second periodic interval for pairs of base stations in the plurality of base stations, and to determine a location of the UE at the first periodic interval using Observed Time Difference of Arrival (OTDOA) based on most recent RTDs and Reference Signal Time Differences (RSTDs) measured by the UE at the first periodic interval for DL signals transmitted by each of the plurality of base stations.

In one implementation, a network entity for supporting location determination of a user equipment (UE) at a first periodic interval, includes an external interface configured to communicate with base station in a Radio Access Network (RAN) and one or more UEs; at least one memory; at least one processor coupled to the external interface and the at least one memory, wherein the at least one processor is configured to: send to the UE, via the external interface, a first request to transmit UL signals at a second periodic interval to a plurality of base stations in the Radio Access Network (RAN), wherein the second periodic interval is longer than the first periodic interval; send to each of the plurality of base stations, via the external interface, a second request to provide uplink (UL) Receive Time-Transmission Time (Rx-Tx) measurements at the second periodic interval of the UL signals transmitted by the UE; receive, via the external interface, the UL Rx-Tx measurements of the UL signals from each of the plurality of base stations at the second periodic interval; determine location information based on the UL Rx-Tx measurements; and send, via the external interface, the location information to the UE at the second periodic interval, wherein the location information enables the UE to determine Real Time Differences (RTDs) at the second periodic interval for pairs of base stations in the plurality of base stations, and to determine a location of the UE at the first periodic interval using Observed Time Difference of Arrival (OTDOA) based on most recent RTDs and Reference Signal Time Differences (RSTDs) measured by the UE at the first periodic interval for DL signals transmitted by each of the plurality of base stations.

In one implementation, a network entity for supporting location determination of a user equipment (UE) at a first periodic interval, includes means for sending to the UE a first request to transmit UL signals at a second periodic interval to a plurality of base stations in a Radio Access Network (RAN), wherein the second periodic interval is longer than the first periodic interval; means for sending to each of the plurality of base stations a second request to provide uplink (UL) Receive Time-Transmission Time (Rx-Tx) measurements at the second periodic interval of the UL signals transmitted by the UE; means for receiving the UL Rx-Tx measurements of the UL signals from each of the plurality of base stations at the second periodic interval; means for determining location information based on the UL Rx-Tx measurements; and means for sending the location information to the UE at the second periodic interval, wherein the location information enables the UE to determine Real Time Differences (RTDs) at the second periodic interval for pairs of base stations in the plurality of base stations, and to determine a location of the UE at the first periodic interval using Observed Time Difference of Arrival (OTDOA) based on most recent RTDs and Reference Signal Time Differences (RSTDs) measured by the UE at the first periodic interval for DL signals transmitted by each of the plurality of base stations.

In one implementation, a non-transitory storage medium including program code stored thereon, the program code is operable to cause at least one processor in a network entity to support location determination of a user equipment (UE) at a first periodic interval, includes program code to send to the UE a first request to transmit UL signals at a second periodic interval to a plurality of base stations in a Radio Access Network (RAN), wherein the second periodic interval is longer than the first periodic interval; program code to send to each of the plurality of base stations a second request to provide uplink (UL) Receive Time-Transmission Time (Rx-Tx) measurements at the second periodic interval of the UL signals transmitted by the UE; program code to receive the UL Rx-Tx measurements of the UL signals from each of the plurality of base stations at the second periodic interval; program code to determine location information based on the UL Rx-Tx measurements; and program code to send the location information to the UE at the second periodic interval, wherein the location information enables the UE to determine Real Time Differences (RTDs) at the second periodic interval for pairs of base stations in the plurality of base stations, and to determine a location of the UE at the first periodic interval using Observed Time Difference of Arrival (OTDOA) based on most recent RTDs and Reference Signal Time Differences (RSTDs) measured by the UE at the first periodic interval for DL signals transmitted by each of the plurality of base stations.

BRIEF DESCRIPTION OF THE DRAWINGS

An understanding of the nature and advantages of various embodiments may be realized by reference to the following figures.

Figure 1:
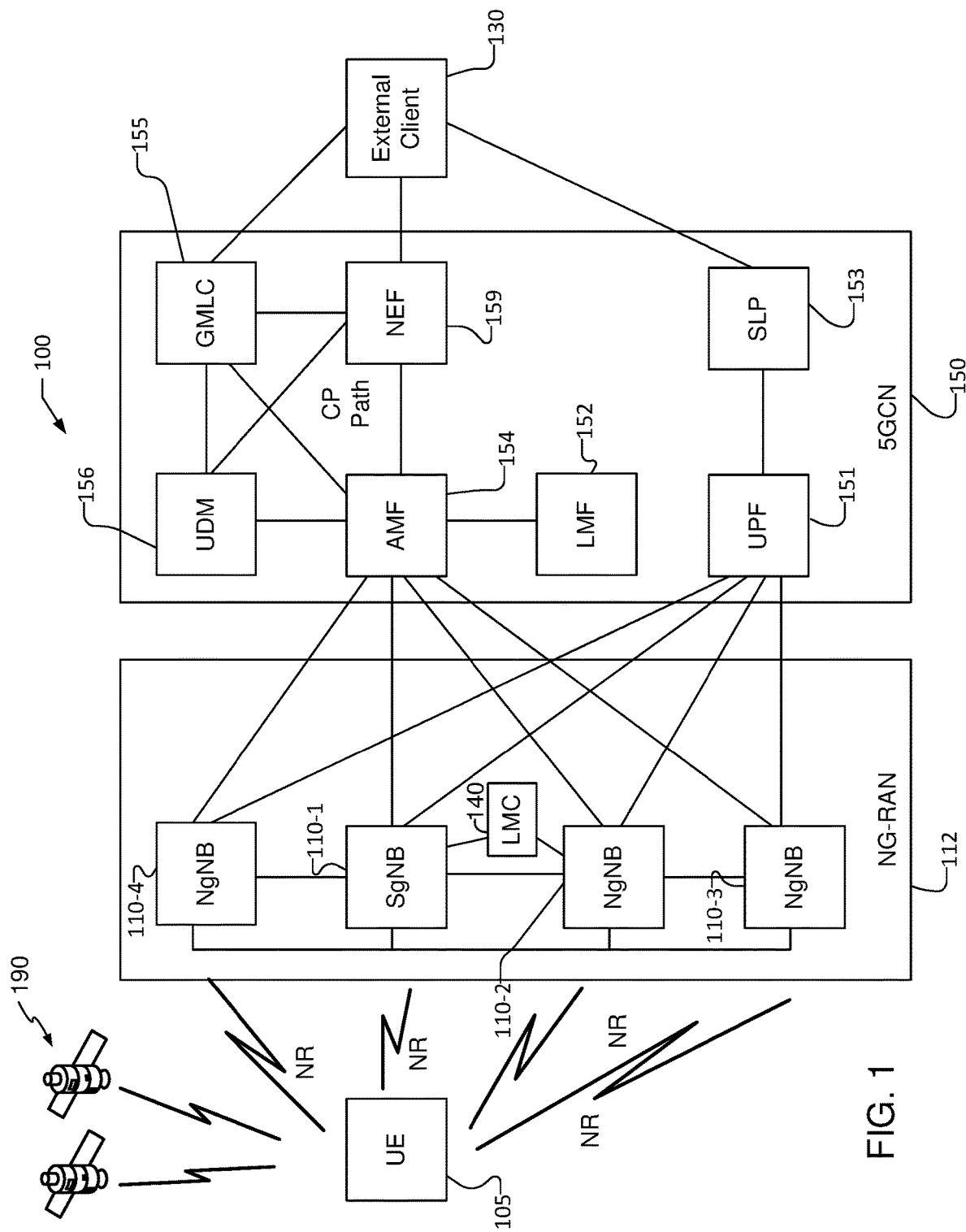
FIG. 1 is a simplified block diagram illustrating a network architecture to support UE based OTDOA using RTD measurements determined by a non-roaming UE.

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g., elements 110 in the previous example would refer to elements 110-1, 110-2 and 110-3).

DETAILED DESCRIPTION

When a GNSS or other satellite position system is not available to a UE, such as when the UE is indoors, UE based Observed Time Difference of Arrival (OTDOA) positioning may be used to produce accurate location tracking by the UE with low latency. With OTDOA based positioning, the UE may measure time differences between downlink (DL) signals received from a plurality of base stations. Because the positions of the base stations can be known with high accuracy, the observed time differences between DL signals received from the base stations may be used to calculate the location of the UE (e.g., using multilateration techniques) with an error of a few tens of meters down to a few meters in a normal indoor or outdoor environment, or less than one meter in a dedicated indoor environment such as a factory or warehouse. With OTDOA, the UE typically measures the time of arrival (TOA) of DL signals received from a base station for a reference cell (e.g., the serving cell) and from base stations for one or more neighboring cells. The TOA for the reference cell is subtracted from the TOA for each of the neighbor cells to determine a Reference Signal Time Difference (RSTD) between the reference cell and each neighbor cell.

In a synchronized network, the DL signal transmissions from base stations typically occur at precisely the same time, and thus, the location determination may rely on the measured RSTDs and the base station locations, which may be provided to the UE by the network or by a third party server based on crowdsourcing. In an asynchronous network, DL signal transmissions from base stations typically occur at different times, which will affect the RSTDs measured from pairs of base stations. OTDOA location then further requires measurements of real time differences (RTDs) between pairs of base stations, which can be problematic because asynchronous networks do not normally determine these and currently lack standards support for determination and delivery of RTDs to a UE. Accordingly, in an asynchronous network, improved means for obtaining measurements of RTDs between pairs of base stations may be needed.

As discussed later herein, in one implementation, UEs may determine RTDs for asynchronous networks using Round Trip Time (RTT) measurements. For Fifth Generation (5G) networks, as standardized by the Third Generation Partnership Project (3GPP), a UE assisted position method known as multi-gNB (New Radio (NR) NodeB) RTT has been defined, also referred to as multi-cell RTT or multi-RTT. With this position method, a UE assists a serving gNB (SgNB) to determine an RTT between the UE and the SgNB and RTTs between the UE and a number of neighbor gNBs (NgNBs) using Receive Time-Transmission Time (Rx-Tx) measurements obtained by both the UE and the gNBs. The RTTs may be used on the network side to determine the UE location (e.g., without the need for OTDOA). However, multi-gNB RTT, or a corresponding UE based variant of the multi-gNB RTT position method, would be likely to have higher latency and a lower maximum rate of location updating than UE based OTDOA, where no measurement transfer is needed, due to a dependence on transferring gNB Rx-Tx measurements to a UE for the UE based variant of multi-gNB RTT, or transferring UE Rx-Tx measurements to a gNB for the UE assisted version of multi-gNB RTT. Additionally, there would be added load to the network and UE to perform these transfers. Therefore, for very low latency high frequency tracking by a UE (e.g., at a rate of 1-10 Hertz (Hz)), UE based OTDOA may be more desirable.

To enable UE based OTDOA in an asynchronous network, a UE may receive RTT measurements from the network (e.g., from an SgNB for the UE) at a low frequency (e.g., 0.1 Hz). Alternatively, the network may provide Rx-Tx measurements to the UE at a low frequency to enable the UE to calculate RTTs at a low frequency. The UE may then combine the RTTs with RSTD measurements to determine RTDs for pairs of gNBs, denoted gNB1 and gNB2, according to the equation:

$$RTD = RSTD - (RTT2 - RTT1) \qquad \text{(Eq. 1)}$$

where the RTD and RSTD are for a time of signal transmission and time of signal arrival, respectively, for gNB2 minus that for gNB1, and the pair of RTTs, RTT1 and RTT2, are measured between the UE and gNB1 and gNB2, respectively. More details concerning the meaning, derivation and usage of Eq. 1 are provided later in association with FIG. 3.

Typically, base stations have stable clocks. For example, 3GPP Technical Specification (TS) 38.104 requires wide area gNBs to support a carrier frequency and thus timing with an accuracy of 0.05 parts per million (ppm) or less. Over a 10 second period, this would allow a clock drift of up to 500 nanoseconds (ns). For a pair of gNBs, this may result in a maximum RTD change of 1 microsecond (µs) over a 10 second period. This rate of change in RTD may be too high for high accuracy OTDOA, but this may be managed in two ways. First, many gNBs may have better clocks than required by the minimum 3GPP requirements (e.g., as has been observed in real base stations for over 20 years). Second, determination of RTDs will provide an indication to a UE of the accuracy of gNB timing and any rate of change in gNB timing, which will allow a UE to (i) determine that a rate of change of an RTD is low enough to be acceptable, (ii) compensate for any change in an RTD (e.g., by determining and correcting for a rate of RTD change), or (iii) reject RTDs which are too inaccurate. For networks where RTDs change by little (e.g., 50 ns or less over a 10 second period) or where RTD change is accurately predictable, a UE can determine RTDs at a low frequency and use the determined RTDs to calculate location using OTDOA at a high frequency. As an example, OTDOA location of a UE might occur at between 1 and 10 Hz and RTD determination by the UE might occur at 0.1 Hz.

In addition, fast crowdsourcing may be used to provide RTD measurements. For example, a plurality of UEs in the same local area may update a server with RTD values determined by each of the UEs and the server may supply the same UEs with more accurate and more extensive RTD information based on measurements from all UEs. For example, the server may combine the RTDs received from all UEs for the same pair of gNBs (e.g., using averaging or weighted averaging) and may send back the combined RTDs to each of the UEs in the plurality.

FIG. 1 shows a network architecture to support UE based OTDOA using RTD measurements determined by a non-roaming UE. FIG. 1 illustrates a communication system 100 that comprises a UE 105, which is sometimes referred to herein as a "target UE", since UE 105 may be the target of a location request. FIG. 1 also shows components of a Fifth Generation (5G) network comprising a Next Generation Radio Access Network (NG-RAN) 112, which includes base stations (BSs) sometimes referred to as New Radio (NR) NodeBs or gNBs 110-1, 110-2, 110-3, and 110-4 (collectively and generically referred to herein as gNBs 110), and a 5G Core Network (5GCN) 150 that is in communication with an external client 130. A 5G network may also be referred to as a New Radio (NR) network; NG-RAN 112 may be referred to as an NR RAN or a 5G RAN; and 5GCN 150 may be referred to as an Next Generation (NG) Core network (NGC). The communication system 100 may further utilize information from space vehicles (SVs) 190 for a GNSS like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

FIG. 1 also shows a serving gNB (SgNB) 110-1 for the target UE 105 and neighbor gNBs (NgNBs) 110-2, 110-3, 110-4. An NgNB may be any gNB which is able to receive and measure uplink (UL) signals transmitted by the target UE 105 and/or is able to transmit a downlink (DL) reference signal (RS) that can be received and measured by the target UE 105.

The NG-RAN 112 may also include location measurement units (LMUs) (not shown in FIG. 1), which can receive and measure signals from the target UE 105 but do not transmit signals to UEs for normal network operation, and/or location transmission units (LTUs) (not shown in FIG. 1), which transmit reference signals to be measured by the target UE 105 but do not receive signals from UEs for normal network operation. An LMU or LTU may be connected to one or more other gNBs 110 and/or to an AMF 154. An LMU and LTU may be combined in the same physical entity.

Entities in the NG-RAN 112 which transmit DL reference signals (RS s) to be measured by a target UE 105 for a particular location session are referred to generically as "Transmission Points" (TPs) and can include one or more of the SgNB 110-1, NgNBs 110-2, 110-3, 110-4, and LTUs (not shown).

Entities in the NG-RAN which receive and measure UL signals (e.g., an RS) transmitted by a target UE 105 for a particular location session are referred to generically as "Reception Points" (RPs) and can include one or more of the SgNB 110-1, NgNBs 110-2, 110-3, 110-4, and LMUs (not shown).

A TP or RP may also be an element within a gNB 110 and may then be referred to as Transmission-Reception Point (TRP). A TRP may act as a TP only, an RP only or as both a TP and an RP. When a gNB 110 comprises a split architecture, as described in 3GPP TS 38.401, a TRP may be, or may be included as part of, a gNB Distributed Unit (gNB-DU).

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 105 may communicate with an Access Network (AN), as opposed to an NG-RAN, and accordingly, component 112 is sometimes referred to herein as an AN or as a Radio Access Network (RAN), denoted by the term "RAN", "(R)AN" or "(R)AN 112". In the case of an AN (e.g., IEEE 802.11 AN), the AN may be connected to a Non-3GPP Interworking Function (N3IWF) (e.g., in SGCN 150) (not shown in FIG. 1), with the N3IWF connected to AMF 154.

The target UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. The target UE 105 may be a stand-alone device or may be embedded in another device, e.g., a factory tool or a package, that is to be monitored or tracked. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as Global System for Mobile Communications (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 150), etc. The UE 105 may also support wireless communication using a Wireless Local Area Network (WLAN) which may connect to other networks (e.g., the Internet) using a Digital Subscriber Line (DSL) or packet cable for example. The use of one or more of these RATs may allow the UE 105 to communicate with an external client 130 (e.g., via elements of 5GCN 150 not shown in FIG. 1, or possibly via a Gateway Mobile Location Center (GMLC) 155, and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, or receiving wireless signals from a cellular transceiver, in the NG-RAN 112, such as a gNB 110. A transceiver provides user and control planes protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from SVs 190 belonging to a Satellite Positioning System (SPS) or GNSS such as GPS, GLONASS, Galileo or Beidou and/or may include measurements of signals received from terrestrial transmitters fixed at known locations (e.g., such as gNBs 110). UE 105 or another entity, such as SgNB 110-1 or LMF 152, to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, multi-RTT, or Enhanced Cell ID (ECID) or combinations thereof. In some of these techniques (e.g., A-GNSS, AFLT and OTDOA), pseudoranges or timing differences may be measured at UE 105 relative to three or more terrestrial transmitters (e.g., gNBs 110) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 105.

A location server, such as the SgNB 110-1, Location Management Function (LMF) 152, or Secure User Plane Location (SUPL) Location Platform (SLP) 153 may be capable of providing positioning assistance data to UE 105 including, for example, information regarding signals to be measured (e.g., expected signal timing, signal coding, signal frequencies, signal Doppler), locations and identities of terrestrial transmitters (e.g., gNBs 110) and/or signal, timing and orbital information for GNSS SVs 190 to facilitate positioning techniques such as A-GNSS, AFLT, OTDOA, multi-RTT and ECID. The facilitation may include improving signal acquisition and measurement accuracy by UE 105 and, in some cases, enabling UE 105 to compute its estimated location based on the location measurements. For example, a location server (e.g., SgNB 110-1, LMF 152, or SLP 153) may comprise an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g., a gNB 110) such as transmission power, carrier frequency, bandwidth, signal coding and signal timing. A UE 105 may obtain measurements of signal strengths (e.g., received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a Receive Time-Transmission Time (Rx-Tx), or a round trip time (RTT) between UE 105 and a cellular transceiver (e.g., a gNB 110) or a local transceiver (e.g., a WiFi access point (AP)). A UE 105 may use these measurements together with assistance data (e.g., terrestrial almanac data or GNSS satellite data such as GNSS Almanac and/or GNSS Ephemeris information) received from a location server (e.g., SgNB 110-1, LMF 152, or SLP 153), or broadcast by a base station (e.g., a gNB 110) in NG-RAN 112, to determine a location for UE 105.

In the case of OTDOA, UE 105 may measure an RSTD between signals, such as a position reference signal (PRS), a Cell specific Reference Signal (CRS), or a Tracking Reference Signal (TRS), transmitted by nearby pairs of transceivers (e.g., gNBs 110). An RSTD measurement may provide the time of arrival difference between signals (e.g., TRS, CRS or PRS) received at UE 105 from two different transceivers. The UE 105 may use the measured RSTDs to compute an estimated location for UE 105 based on known locations and known signal timing for the measured transceivers, as discussed herein. In some implementations of OTDOA, the signals used for RSTD measurements (e.g., PRS or CRS signals) may be accurately synchronized by the transceivers to a common universal time such as GPS time or Coordinated Universal Time (UTC), e.g., using a GPS or GNSS receiver at each transceiver to accurately obtain the common universal time. In an asynchronous network, the signals used for RSTD measurements (e.g., PRS or CRS signals) may not be accurately synchronized by the transceivers, and the UE 105 may determine RTDs for different transceiver pairs and use the RTDs along with the RSTD measurements and known locations of the transceivers to compute the estimated location for UE 105, as described herein.

In some implementations, network entities are used to assist in location of a target UE 105. For example, entities in a network such as gNBs 110 may measure UL signals transmitted by UE 105. The UL signals may include or comprise UL reference signals such as UL positioning reference signals (PRSs) or UL Sounding Reference Signals (SRSs). The entities obtaining the location measurements (e.g., gNBs 110) may then transfer the location measurements to the UE 105, which may use the measurements to determine RTDs for multiple transceiver pairs. Examples of UL location measurements can include an RSSI, RSRP, RSRQ, TOA, Rx-Tx, AOA and RTT.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. The location may be expressed as an absolute location estimate for the UE 105, such as location coordinates or address, or as a relative location estimate for the UE 105, such as a distance and direction from a previous location estimate or from a known absolute location. The location of the UE 105 may also include a linear velocity, an angular velocity, a linear acceleration, an angular acceleration, an angular orientation for the UE 105, e.g., the orientation of the UE 105 relative to a fixed global or local coordinate system, an identification of a trigger event for locating the UE 105, or some combination of these. For example, trigger events may include an area event, a motion event or a velocity event. When computing the location of a UE 105, it is common to solve for local x, y, and possibly z coordinates and then, if needed, convert the local coordinates into absolute ones (e.g., for latitude, longitude and altitude above or below mean sea level).

As shown in FIG. 1, pairs of gNBs 110 in NG-RAN 112 may be connected to one another, e.g., directly as shown in FIG. 1 or indirectly via other gNBs 110. Access to the 5G network is provided to UE 105 via wireless communication between the UE 105 and one or more of the gNBs 110, which may provide wireless communication access to the SGCN 150 on behalf of the UE 105 using 5G (e.g., NR). In FIG. 1, the serving gNB for UE 105 (SgNB) is assumed to be gNB 110-1, although other gNBs (e.g., gNB 110-2 and/or gNB 110-3) may act as a serving gNB if UE 105 moves to another location or may act as a secondary gNB to provide additional throughout and bandwidth to UE 105. Some gNBs 110 in FIG. 1 (e.g., gNB 110-2 or gNB 110-3) may be configured to function as positioning-only beacons (referred to here as LTUs) which may transmit signals (e.g., directional PRS) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the SGCN 150. Thus, the NG-RAN 112 may include any combination of gNBs or other types of base stations or access points. As an example, NG-RAN 112 may include one or more next generation evolved Node Bs (ng-eNBs), not shown, which provide LTE wireless access to UE 105 and may connect to entities in SGCN 150 such as AMF 154.

The gNBs 110 and/or the ng-eNBs can communicate with the Access and Mobility Management Function (AMF) 154, which, for positioning functionality, may communicate with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105 supported by the UPF 151. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The SgNB 110-1 may support positioning of the UE 105 when UE 105 accesses the NG-RAN 112. The SgNB 110-1 may also process location service requests for the UE 105, e.g., received directly or indirectly from the AMF 154, GMLC 155 or NEF 159. In some embodiments, a node/system that implements the SgNB 110-1 may additionally or alternatively implement other types of location-support modules, such as an Enhanced Serving Mobile Location Center (E-SMLC) or an SLP 153. It will be noted that in some embodiments, at least part of the positioning functionality (including derivation of UE 105's location) may be performed at the UE 105 (e.g., using signal measurements for signals transmitted by wireless nodes, and assistance data provided to the UE 105).

The GMLC 155 may support a location request for the UE 105 received from an external client 130 and may forward such a location request to a serving AMF 154 for UE 105. The AMF 154 may then forward the location request to either SgNB 110-1 or LMF 152, which may obtain one or more location estimates for UE 105 (e.g., according to the request from external client 130) and may return the location estimate(s) to AMF 154, which may return the location estimate(s) to external client 130 via GMLC 155. GMLC 155 may contain subscription information for an external client 130 and may authenticate and authorize a location request for UE 105 from external client 130. GMLC 155 may further initiate a location session for UE 105 by sending a location request for UE 105 to AMF 154 and may include in the location request an identity for UE 105 and the type of location being requested (e.g., such as a current location or a sequence of periodic or triggered locations).

The LMF 152 and the gNBs 110 may communicate using a New Radio Position Protocol A (NRPPa). NRPPa may be defined in 3GPP TS 38.455, with NRPPa messages being transferred between the gNBs 110 and the LMF 152 via AMF 154. Further, the LMF 152 and UE 105 may communicate using the LTE Positioning Protocol (LPP) defined in 3GPP TS 36.355 and TS 37.355, where LPP messages are transferred between the UE 105 and the LMF 152 via the serving AMF 154 and the serving SgNB 110-1 for UE 105. For example, LPP messages may be transferred between the AMF 154 and the UE 105 using a 5G Non-Access Stratum (NAS) protocol. The LPP protocol may be used to support positioning of UE 105 using UE assisted and/or UE based position methods such as A-GNSS, Real Time Kinematic (RTK), Wireless Local Area Network (WLAN, OTDOA, multi-RTT and/or ECID. The NRPPa protocol may be used to support positioning of UE 105 using network based position methods such as ECID or combined network and UE position methods such as multi-RTT (e.g. when used with measurements obtained by a gNB 110 or received from a gNB 110 from UE 105) and/or may be used by LMF 152 to obtain location related information from gNBs 110 such as parameters defining positioning reference signal (PRS) transmission from gNBs 110 for support of OTDOA or multi-RTT.

GNBs 110 may communicate with AMF 154, to support location of a UE 105, using a Next Generation Application Protocol (NGAP), e.g., as defined in 3GPP Technical TS 38.413, or using a first location specific protocol (referred to here as LSP1) transported by NGAP. NGAP or the LSP1 may enable AMF 154 to request a location of a target UE 105 from an SgNB 110-1 for target UE 105 and may enable SgNB 110-1 to return a location for UE 105 to the AMF 154. In some embodiments, a separate location server, similar to LMF 152 and referred to here as a Location Management Component (LMC) 140, may be included in NG-RAN 112 and may be connected, directly or via intermediate entities, to one or more gNBs 110 including SgNB 110-1. In that case, if AMF 154 sends request for a location of a target UE 105 to SgNB 110-1 using NGAP or LSP1, SgNB 110-1 may forward the request to LMC 140 (e.g. using XnAP) and may later receive a location for UE 105 obtained by LMC 140 and may then return the location to the AMF 154. LMC 140 may also be reffered to as a local LMF or as an NG-RAN location server function, or by another name, and may function principally as a location server that assists a UE 105 to obtain its own location or obtains the location of a UE 105.

GNBs 110 may communicate with one another, to support location of a UE 105, using an Xn Application Protocol (XnAP), e.g., as defined in 3GPP TS 38.423, or using a second location specific protocol (referred to here as LSP2) transported by XnAP, which may be different to LSP1. XnAP or LSP2 may allow one gNB 110 or LMC 140 to request another gNB 110 to obtain UL location measurements for a target UE and to return the UL location measurements. XnAP or LSP2 may also enable a gNB 110 or LMC 140 to request another gNB 110 to transmit a downlink (DL) RS or PRS to enable a target UE 105 to obtain DL location measurements of the transmitted DL RS or PRS. In some embodiments, LSP2 (when used) may be same as or an extension to NRPPa.

A gNB (e.g., SgNB 110-1) or LMC 140 may communicate with a target UE 105, to support location of a UE 105, using a Radio Resource Control (RRC) protocol, e.g., as defined in 3GPP TS 38.331, or using a third location specific protocol (referred to here as LSP3) transported by RRC, which may be different to LSP1 and LSP2. RRC or LSP3 may allow a gNB 110 (e.g., SgNB 110-1) or LMC 140 to request a UE 105 to obtain location measurements of DL RS s or DL PRSs transmitted by the gNB 110 and/or by other gNBs 110 and to return some or all of the location measurements to the gNB 110 or LMC 140. RRC or LSP3 may also enable a gNB 110 (e.g., SgNB 110-1) or LMC 140 to request a target UE 105 to transmit an UL RS or PRS to enable the gNB 110 or other gNBs 110 to obtain UL location measurements of the transmitted UL RS or PRS. In some embodiments, LSP3 (when used) may be same as or an extension to LPP.

With a UE assisted position method, UE 105 may obtain location measurements (e.g., measurements of RSSI, Rx-Tx, RTT, RSTD, RSRP and/or RSRQ for DL RS s or PRSs transmitted by gNBs 110, ng-eNB 114 or WLAN APs, or measurements of GNSS pseudorange, code phase and/or carrier phase for navigation signals transmitted by SVs 190) and may send the location measurements to an entity performing a location server function, e.g., SgNB 110-1, LMC 140, LMF 152, or SLP 153, for computation of a location estimate for UE 105. With a UE based position method, UE 105 may obtain location measurements (e.g., which may be the same as or similar to location measurements for a UE assisted position method) and may compute a location of UE 105 (e.g., with the help of assistance data received from a location server such as SgNB 110-1, LMC 140, LMF 152 or SLP 153). With a network based position method, one or more base stations (e.g., gNBs 110) or APs may obtain location measurements (e.g., measurements of RSSI, RTT, RSRP, RSRQ, Rx-Tx or TOA for signals transmitted by UE 105) and/or may receive measurements obtained by UE 105, and may send the measurements to a location server, e.g., SgNB 110-1, LMC 140 or LMF 152, for computation of a location estimate for UE 105.

With a combined network and UE position method, also referred to as an uplink-downlink position method, such as multi-RTT, UE 105 may obtain DL location measurements (e.g. Rx-Tx measurements) of signals (e.g. DL PRS) transmitted by gNBs 110, and gNBs 110 may obtain UL location measurements (e.g. Rx-Tx measurements) of signals (e.g. UL SRS) transmitted by UE 105. Then, for UE assisted positioning, UE 105 may transfer the DL location measurements, and the gNBs 110 may transfer the UL location measurements, to a location server (e.g., SgNB 110-1, LMC 140, LMF 152 or SLP 153) for computation of a location estimate for UE 105, based on both the UL and DL location measurements. Alternatively, for UE based positioning, the gNBs 110 or a location server (e.g., SgNB 110-1, LMC 140, LMF 152 or SLP 153), may transfer the UL location measurements to UE 105 for computation of a location estimate for UE 105 by UE 105 based on both the UL and DL location measurements.

Information provided by the gNBs 110 to the SgNB 110-1 or LMC 140 using XnAP or LSP2 may include timing and configuration information for PRS transmission by the gNBs 110 and/or location coordinates of the gNBs 110. The SgNB 110-1 or LMC 140 can then provide some or all of this information to the UE 105 as assistance data in an RRC or LSP3 message. An RRC message sent from SgNB 110-1 or LMC 140 to UE 105 may include an embedded LSP3 message (e.g., an LPP message) in some implementations.

An RRC or LSP3 message sent from SgNB 110-1 or LMC 140 to the UE 105 may instruct the UE 105 to do any of a variety of things, depending on desired functionality. For example, the RRC or LSP3 message could contain an instruction for the UE 105 to obtain measurements for GNSS (or A-GNSS), WLAN, OTDOA and/or multi-RTT (or some other position method) or to transmit uplink (UL) signals, such as Positioning Reference Signals, Sounding Reference Signals, or both. In the case of OTDOA, the RRC or LSP3 message may instruct the UE 105 to obtain one or more measurements (e.g., RSTD measurements) of PRS signals transmitted within particular cells supported by particular gNBs 110. The UE 105 may use the measurements to determine the position of UE 105, e.g., using OTDOA.

A gNB 110 in NG-RAN 112 may also broadcast positioning assistance data to UEs such as UE 105.

As illustrated in FIG. 1, a Unified Data Management (UDM) 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management.

To support services including location services from external clients 130 for Internet of Things (IoT) UEs, a Network Exposure Function (NEF) 159 may be included in 5GCN 150. The NEF 159 may support secure exposure of capabilities and events concerning 5GCN 150 and UE 105 to an external client 130 and may enable secure provision of information from external client 130 to 5GCN 150. In the context of location services, NEF 159 may function to obtain a current or last known location for a UE 105, may obtain an indication of a change in location for a UE 105, or an indication of when a UE 105 becomes available (or reachable). The NEF 159 may be connected to the GMLC 155 to support last known location, current location and/or deferred periodic and triggered location for the UE 105 by sending requests to and receiving responses from GMLC 155. NEF 159 may also or instead be connected to AMF 154 to support last known location, current location and/or deferred periodic and triggered location for the UE 105 by sending requests to and receiving responses from AMF 154.

The User Plane Function (UPF) 151 may support voice and data bearers for UE 105 and may enable UE 105 voice and data access to other networks such as the Internet. UPF 151 functions may include: external PDU session point of interconnect to a Data Network, packet (e.g., Internet Protocol (IP)) routing and forwarding, packet inspection and user plane part of policy rule enforcement, Quality of Service (QoS) handling for user plane, downlink packet buffering and downlink data notification triggering. UPF 151 may be connected to SLP 153 to enable support of location of UE 105 using the SUPL user plane location solution defined by the Open Mobile Alliance (OMA). SLP 153 may be further connected to or a accessible from external client 130.

It should be understood that while FIG. 1 shows a network architecture for a non-roaming UE, with suitable, well-known, changes, a corresponding network architecture may be provided for a roaming UE.

Figure 2:
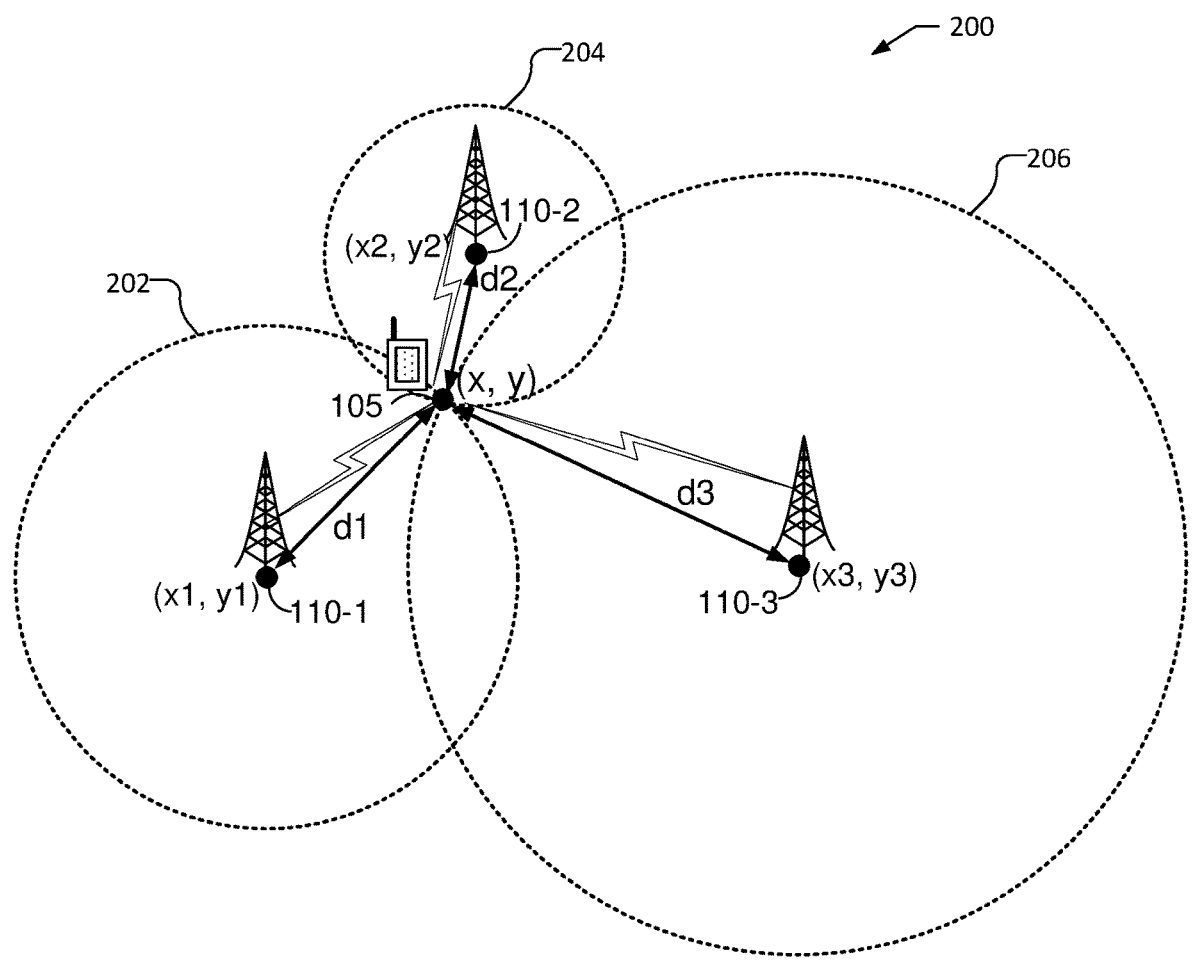
FIG. 2 illustrates a simplified environment and an exemplary technique for determining a position of a UE based on Round Trip Time (RTT).

FIG. 2 illustrates a simplified environment and an exemplary technique for determining a position of a UE 105 using multi-RTT. The position of UE 105 may be represented in 2 dimensions by Cartesian coordinates (x, y). RTT measurements may then be obtained (e.g. as described later for FIG. 4) for three gNBs, 110-1, 110-2 and 110-3, with coordinates (xk, yk), where k=1, 2, 3. The UE 105 or a separate location server (e.g. SgNB 110-1, LMC 140, LMF 152 or SLP 153) may then determine a distance dk, where k=1, 2, 3, to each of the three gNBs 110-k. The distance dk to each gNB 110-k is given by:

$$dk=RTTk*c/2 \quad (Eq. 2)$$

where RTTk is the measured RTT for gNB 110-k and c is the signal speed (e.g. speed of light).

Once each distance dk is determined, the UE 105 or the location server can solve for the UE 105 position (x, y) by using a variety of known geometric techniques, such as, for example, trilateration. From FIG. 2, it can be seen that the position of the UE 105 ideally lies at the common intersection of all of the circles 202, 204, and 206 drawn using dotted lines. Each circle is defined by a radius dk and center (xk, yk), where k=1, 2, 3. In practice, the intersection of these circles may not lie at a single point due to noise and other errors in obtaining RTT measurements. The method, as illustrated in FIG. 2, can be extended to a greater number of gNBs 110 and may be used to determine a three dimensional location of UE 105 (e.g. from the common intersection point of spheres centered on each of the gNBs 110) if the gNBs 110 are at different heights. Such extensions are commonly known to those versed in the art.

Figure 3:
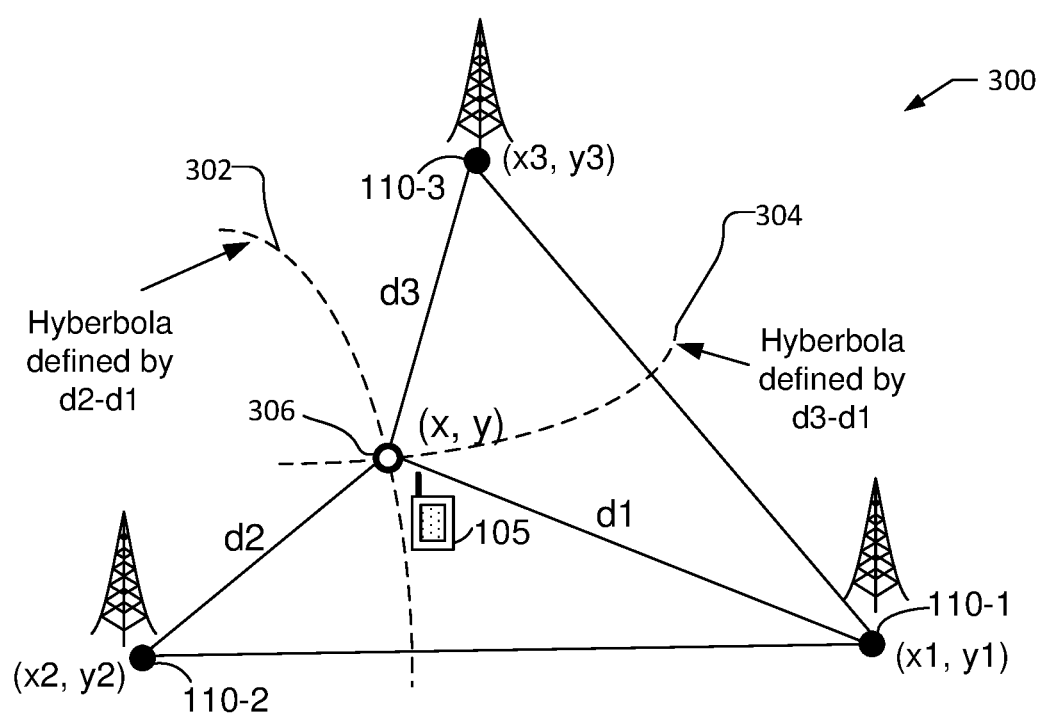
FIG. 3 illustrates a simplified environment and an exemplary technique for determining a position of a UE based on Observed Time Difference of Arrival (OTDOA).

FIG. 3 illustrates a simplified environment, similar to FIG. 2, and another exemplary technique for determining a position of a UE 105. In FIG. 3, the UE 105 measures the Time of Arrival (TOA) of reference signals received from each of the three gNBs 110-k (for k=1, 2 and 3) from FIG. 2 relative to an internal time base of the UE 105. Between each pair of gNBs 110, the UE 105 measures the Reference Signal Time Difference (RSTD), which is the relative timing difference between a pair of gNBs, e.g., a reference gNB 110 (e.g., SgNB 110-1) and a measured gNB (e.g., gNB 110-2), which can be determined as the time difference between a subframe boundary received from the reference gNB 110 and the closest (next or preceding) subframe boundary received from the measured gNB 110. For example, an RSTD may be measured as the difference between the TOA of a reference signal from the reference gNB 110 and the TOA of a corresponding reference signal from the measured gNB 110.

The determination of the UE 105 location may then be based on the following observations. As is well known in the art, OTDOA location can be based on three quantities: Time Difference of Arrival (TDOA), Real Time Difference (RTD) and Geometric Time Difference (GTD). A TDOA can be the time interval that is observed by UE 105 between the reception of a DL RS from each of two different gNBs 110 and can correspond to an RSTD measurement. If a DL RS from gNB 110-1 in FIG. 3 (e.g. indicating a subframe boundary) is received by UE 105 at a time t1, and a corresponding DL RS from gNB 110-2 that is closest in time to t1 is received by UE 105 at a time t2, the TDOA value is (t2−t1). RTD can mean the relative synchronization difference in the network between two gNBs. If the gNB 110-1 sends a DL RS (e.g. indicating a subframe boundary) at a time t3, and the gNB 110-2 sends a corresponding DL RS at a time t4, the RTD between them is (t4−t3). If the gNBs transmit at exactly the same time, the gNBs are synchronized and the RTD is zero. The GTD is the time difference between the reception of a DL RS from each of two different gNBs 110 due to geometry. If the length of a propagation path between gNB 110-1 and the UE 105 is d1, and the length of a propagation path between gNB 110-2 and the UE 105 is d2, then GTD is ((d2−d1)/c), where c is the speed of radio waves. The relationship between these three quantities is:

$$TDOA=RTD+GTD \quad (Eq. 3)$$

GTD is the quantity that is useful for location purposes (e.g., using OTDOA), since it contains information about the position of UE 105. If only TDOA values are known (e.g., measured RSTDs), no location of UE 105 can typically be calculated with an asynchronous network, since RTD values must also be known. However, if RTD values are also available, then the UE 105 for UE based OTDOA, or a location server (e.g. SgNB 110-1, LMC 140, LMF 152 or SLP 153) for UE assisted OTDOA, may determine the location of UE 105 using TDOA (or RSTD) measurements for at least two pairs of gNBs and typically more pairs of gNBs. This is illustrated in FIG. 3. A determination of the GTD between gNBs 110-1 and 110-2 in FIG. 3 may locate the UE 105 on a hyperbola 302 illustrated in FIG. 3. A similar determination of a GTD between gNBs 110-1 and 110-3 in FIG. 3 (via a measurement of an RSTD or TDOA between gNBs 110-1 and 110-3 by UE 105) may similarly locate the UE 105 on a hyperbola 304 illustrated in FIG. 3. The intersection of the two hyperbolas at the point 306 in FIG. 3 may then locate the UE 105 (though typically more hyperbolas would be obtained from RSTD measurements for more pairs of gNBs to remove ambiguity and reduce error in the location of UE 105). Known multilateration techniques may be employed to determine the location of UE 105 using hyperbolas such as hyperbolas 302 and 304 illustrated in FIG. 3.

In synchronous networks, RTDs are usually zero (or close to zero). In asynchronous networks, the RTDs could be determined using TDOA (RSTD) and RTT measurements. If the RTT between UE 105 and each of gNB 110-1 and gNB 110-2 is determined (e.g., as described later in association with FIG. 4), and the UE 105 measures in addition the TDOA (e.g., RSTD) between the two gNBs, the RTD could be determined as:

$$RTD=TDOA-GTD \qquad (\text{Eq. 4})$$

Giving:

$$RTD=TDOA-(RTT2-RTT1)/2 \qquad (\text{Eq. 5})$$

Where RTT1 is the RTT between UE 105 and gNB 110-1 and RTT2 is the RTT between UE 105 and gNB 110-2.

The UE 105 or a location server (e.g. SgNB 110-1, LMC 140, LMF 152 or SLP 153) may use Eq. 5 to determine timing information in the form of RTDs for pairs of gNBs 110 based on measurements of RSTD between pairs of gNBs 110 and measurements of RTT for each gNB 110.

Thus, for a UE based OTDOA positioning method, the UE 105 needs to measure the RSTDs for multiple pairs of gNBs 110, and needs the location of each gNB 110, which the UE 105 may receive in assistance data from the serving gNB 110-1 (or broadcast by the SgNB 110-1) or from a location server such as LMC 140, LMF 152 or SLP 153. The UE 105 additionally needs to determine the RTD for each pair of gNBs 110, which may be determined as described above according to Eq. 5 using RSTD and RTT measurements. The UE 105 may receive the RTT for each gNB 110 from a location server (e.g., LMC 140, LMF 152 or SLP 153), or from SgNB 110-1 or may calculate the RTT based on UL Rx-Tx measurements for each gNB 110 provided by the network (e.g., provided by SgNB 110-1).

Figure 4:
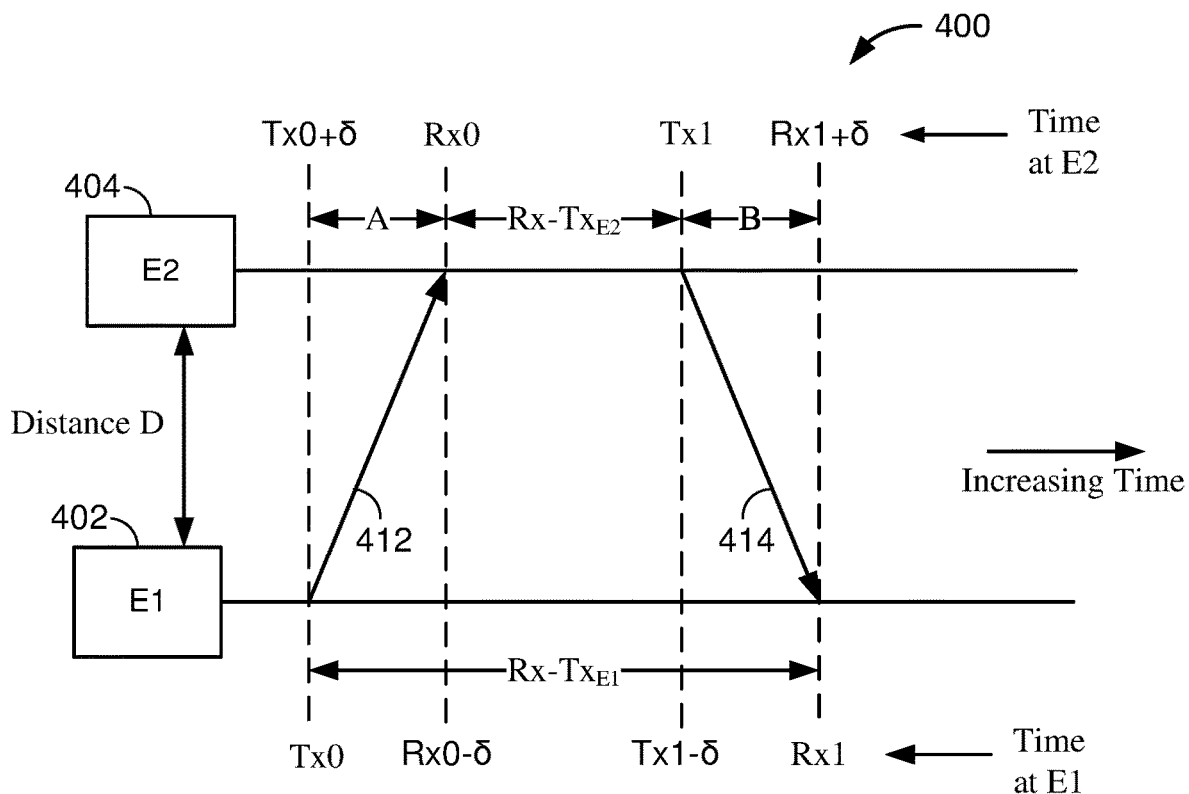
FIG. 4 is a diagram showing exemplary timings within an RTT measurement occurring during a wireless probe request and a response.

FIG. 4 is a diagram 400 showing exemplary timings within an RTT measurement occurring during a wireless probe request and a response. In FIG. 4, entity E1 402 corresponds to either UE 105 or a gNB 110, while entity E2 404 corresponds to the other of UE 105 and the gNB 110. In FIG. 4, a straight line distance D between E1 402 and E2 404 is represented vertically, while time is represented horizontally with time increasing from left to right. Local transmission and reception times at E1 402 are shown at the bottom of diagram 400, while local transmission and reception times at E2 404 are shown at the top of diagram 400. In the case of a gNB 110, local transmission and reception timing will normally be identical. In the case of a UE 105, local transmission timing will normally lead (i.e., exceed) local reception timing by an amount known as a "timing advance" or "timing adjust", commonly abbreviated as TA, in order for UE 105 local transmission timing to approximately coincide with gNB 110 local reception timing from the perspective of a serving gNB 110-1 or to arrive at the serving gNB 110-1 at some other preferred time. In order to compensate for this difference, a known value for TA can be subtracted by UE 105 from any local transmission time at the UE 105 (e.g. to obtain the value of Tx0 when E1 402 is the UE 105 or to obtain the value of Tx1 when E2 404 is the UE 105).

Local timing (also referred to simply as timing) at E2 404 in FIG. 4 is assumed to be an amount δ ahead of local timing at E1 402 (though can be behind timing at E1 402 if δ is negative). E1 402 is assumed to transmit an RTT measurement signal (or message) 412 at time Tx0 at E1 402 (and thus at time Tx0+δ at E2 404), which is received at E2 404 at time Rx0 at E2 404 (and thus at time Rx0−δ at E1 402). Sometime later, E2 404 transmits an RTT Response message or signal 414 at time Tx1 at E2 404 (and thus at time Tx1−δ at E1 402), which is received at E1 402 at time Rx1 (and thus at time Rx1+δ at E2 404). The equations below diagram 400 assume that compensation for any TA has already occurred, and show how the RTT can be obtained from the transmission and reception times Tx0, Rx0, Tx1 and Rx1, based on well-known rules for modulo arithmetic. In particular, provided RTT is less than 1 millisecond (ms) (which would mean a distance D between the UE and gNB that is less than 150 kilometers, which may be very likely in any 5G network), RTT can be obtained as the sum, modulo 1 ms, of a pair of Rx-Tx measurements at each of E1 402 and E2 404. For a UE 105 and gNB 110, this enables either UE 105 or the gNB 110 to obtain the RTT by measuring Rx-Tx and being provided with the Rx-Tx measured by the other of UE 105 and gNB 110. Alternatively, a location server (e.g. SgNB 110-1, LMC 140, LMF 152 or SLP 153) which is provided with both Rx-Tx measurements can obtain the RTT.

Due the properties of modulo arithmetic, it is also unnecessary that E1 402 and E2 404 both obtain their Rx-Tx measurements for the same pair of signals 412 and 414. Instead, E2 404 may obtain Rx-Tx for a different pair of signals having the property that the signal used to obtain the Rx measurement (corresponding to Rx0 in FIG. 4) is received by E2 404 at an exact integer number of milliseconds before or after signal 412 and the signal used to obtain the Tx measurement (corresponding to Tx1 in FIG. 4) is transmitted by E2 404 at an exact integer number of milliseconds before or after signal 414. These properties apply when the signals which are transmitted and received by E1 402 and E2 404 (e.g. signals 412, 414 and any other signals used to obtain Rx-Tx measurements) correspond to 1 ms subframe boundaries or to a pair of common fixed UL and DL subframe positions. As a hypothetical example of the latter, the signals might correspond to a fixed position which occurs 100 microseconds after the start of any UL subframe or 300 microseconds after the start of any DL subframe. It is also possible for signal 414 to be transmitted before, or at the same time as, signal 412, as the derivation of Eq. (420) in FIG. 4 would still apply. Because of this, E1 402 and E2 404 can each obtain Rx-Tx measurements independently of one another (e.g. at different times and using different pairs of signals) as long as the distance D remains fixed (e.g. E1 402 and E2 404 remain stationary relative to one another).

Figure 5:
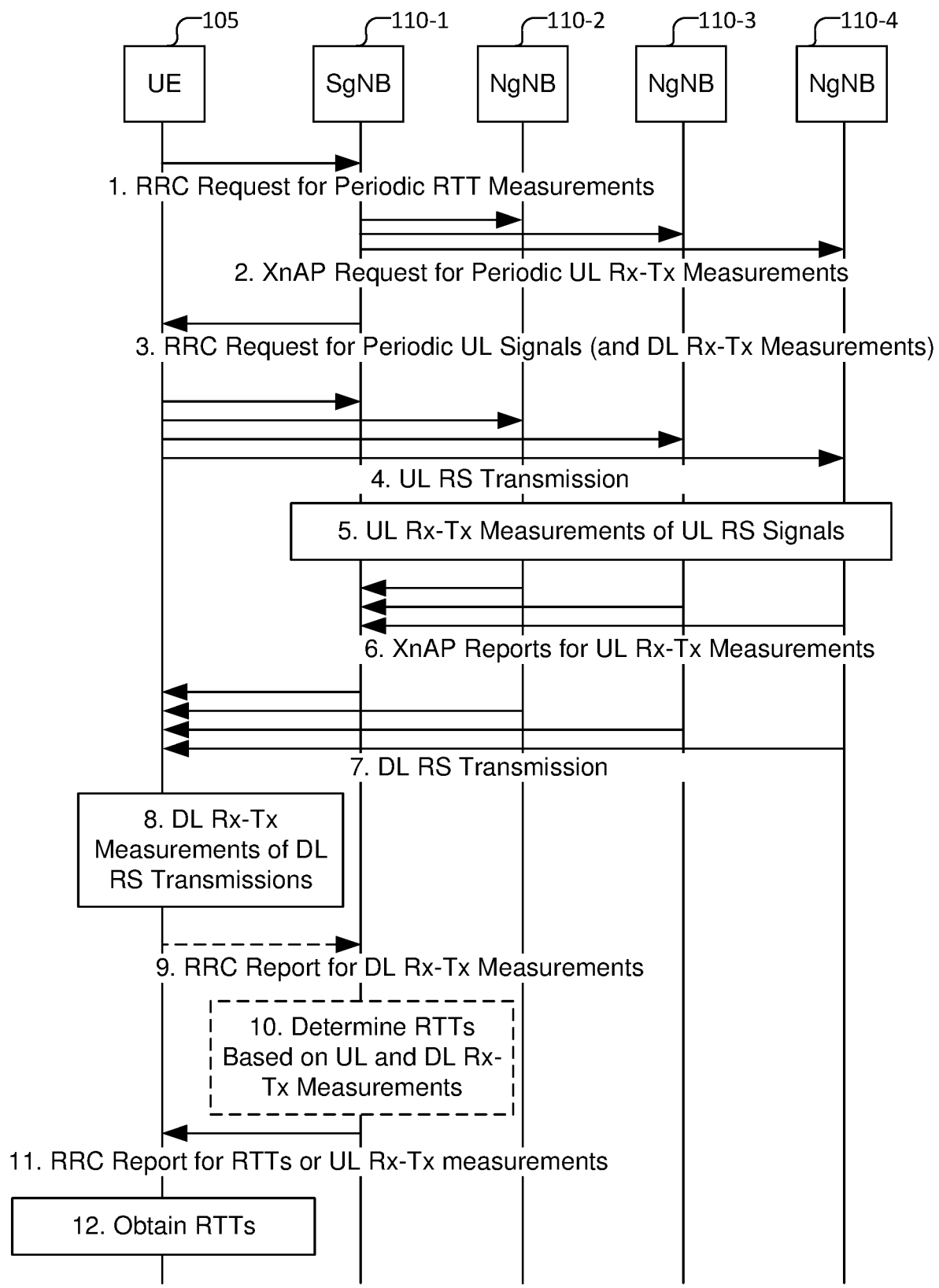
FIG. 5 shows a procedure to support RTT measurement determination by the UE.

FIG. 5 shows a location session establishment and procedure to support RTT measurement determination by UE 105, which is applicable to the communication system 100 of FIG. 1. While the UE 105 may use determined RTTs, along with known locations of the base stations, e.g., gNBs 110-1, 110-2, 110-3, and 110-4, to determine the location of the UE 105, the process of determining RTTs by the UE 105 requires additional load on the network and is relatively slow and has greater latency than if the UE 105 uses the RTTs to support UE based OTDOA location determination, as described further down for FIG. 6. Accordingly, the UE 105 may perform UE based OTDOA location determination at a first periodic interval, as discussed below in FIG. 6, using RTTs determined at a second periodic interval, as illustrated in FIG. 5, where the first periodic interval is shorter than the second periodic interval.

As illustrated in FIG. 5, the RTTs may be determined (e.g., as described for FIG. 4) based on signals and measurements from UE 105, e.g., DL Rx-Tx measurements by the UE 105 of DL RS signals transmitted by the base stations, e.g., gNBs 110-1, 110-2, 110-3, and 110-4, and UL Rx-Tx measurements obtained by the base stations of UL RS signals transmitted by the UE 105. In some implementations, the RTTs may be determined based on additional signals and measurements for a plurality of UEs in addition to the UE 105. For example, the additional signals and measurements may include DL Rx-Tx measurements obtained by the plurality of UEs of DL RS signals transmitted by the base stations (e.g., gNBs 110-1, 110-2, 110-3, and 110-4) and UL Rx-Tx measurements obtained by the base stations of UL RS signals transmitted by the plurality of UEs.

At stage 1 in FIG. 5, the UE 105 sends an RRC Request or an LSP3 Request (e.g., LPP request) for Periodic RTT Measurements to the SgNB 110-1 (or to an other network entity such as another gNB 110, LMC 140, LMF 152, or SLP 153). The RRC or LSP3 Request for Periodic RTT Measurements may request that the SgNB 110-1 (or the other network entity) periodically provide location information to the UE 105 at the second periodic interval, from which RTTs for nearby base stations (e.g. SgNB 110-1 and NgNBs 110-2, 110-3, 110-4) may be obtained by the UE 105. For example, the UE 105 may request that the SgNB 110-1 (or the other network entity) periodically provide measured RTTs for the base stations to the UE 105, or that the SgNB 110-1 periodically provide measurements, e.g., UL Rx-Tx measurements, obtained by the base stations to the UE 105, from which the UE 105 can determine RTTs for the nearby base stations.

At stage 2, the SgNB 110-1 (or the other network entity) may select a plurality of base stations, e.g., SgNB 110-1 and NgNBs 110-2, 110-3, 110-4, to (a) obtain periodic UL Rx-Tx measurements of signals to be transmitted by the UE 105, and (b) transmit DL reference signals (RS s) to be measured by the UE 105. The SgNB 110-1 (or the other network entity) sends an XnAP Request message or an LSP2 request message for Periodic UL Rx-Tx measurements to each selected gNB 110, excluding the SgNB 110-1 if the sender is the SgNB 110-1, to request periodic UL Rx-Tx measurements, e.g., at the second periodic interval, of signals to be transmitted by the UE 105. Each request may indicate the type of signal(s) to be later transmitted by the UE 105 (e.g., whether this is an UL PRS or other type of UL RS) and may include characteristics of the signal(s) such as bandwidth, coding, timing and frequency of transmission. The request may also indicate a Quality of Service (QoS) for the measurements (e.g., accuracy, latency in obtaining the measurements, reliability). In addition to an indication of the periodicity, the request may provide a start time and end time. The SgNB 110-1 (or the other network entity) may further request (in the same request message or in a separate request message) each gNB 110 to transmit periodic DL RSs to be measured by the UE 105. The DL reference signals may include positioning reference signals (PRSs), tracking reference signals (TRSs) or other types of RS and may include omnidirectional RSs and/or directional (e.g., beamformed) RSs. The DL RSs may be configured to coincide or nearly coincide with the UL Rx-Tx measurements obtained for the UE 105. The configuration information sent to each gNB 110 may include RS details (e.g., bandwidth, timing and frequency of transmission) and a start and end time. Each gNB 110 may return a response to the SgNB 110-1 (or the other network entity) confirming whether or not the requested DL RS configuration can be performed (not shown in FIG. 5).

At stage 3, the SgNB 110-1 (or the other network entity) sends an RRC or LSP3 Request message for Periodic UL Signals to the UE 105 to request periodic UL transmission by the UE 105 of an UL RS (e.g., an UL PRS or UL SRS), e.g., at the second periodic interval, to support the periodic UL Rx-Tx measurements requested at stage 2. The request may include details about the required UL RS (e.g., coding, bandwidth, carrier frequency, frequency and timing of transmission, and/or a start time and end time for transmission). The SgNB 110-1 (or the other network entity) may further request (e.g. in the same request message or in a separate request message) that the UE 105 perform periodic DL Rx-Tx measurements of signals to be transmitted by SgNB 110-1, and NgNBs 110-2, 110-3, 110-4. The SgNB 110-1 (or the other network entity) may request that the UE 105 provides the SgNB 110-1 (or the other network entity) with the periodic DL Rx-Tx measurements if the SgNB 110-1 (or the other network entity) is to determine RTTs and provide the determined RTTs to the UE 105. The request may further indicate a QoS for the DL Rx-Tx measurements (e.g., accuracy, latency in obtaining the measurements, reliability). The UE 105 may return a response to the SgNB 110-1 (or the other network entity) confirming whether or not the periodic UL RS can be transmitted and the periodic DL Rx-Tx measurements can be obtained (not shown in FIG. 5). In some implementations, part or all of stage 3 may occur before part or all of stage 2, e.g. in order request UL Rx-Tx measurements from gNB s 110 at stage 2 after periodic UL RS transmission by UE 105 has been requested and confirmed at stage 3.

At stage 4, the UE 105 commences to transmit the configured UL RS and continues to periodically transmit the UL RS until the requested end time or until transmission of the UL RS is canceled or reconfigured by the SgNB 110-1 (or the other network entity). The UL signals may be Positioning Reference Signals, Sounding Reference Signals, or both.

At stage 5, the SgNB 110-1 and NgNBs 110-2, 110-3, 110-4 receive the UL RS signals transmitted at stage 4 and obtain UL Rx-Tx measurements for the UL RS signals. The UL Rx-Tx measurements may be obtained at each of the periodic measurement occasions. In one implementation, a plurality of UEs in addition to UE 105 may transmit UL RS signals, and the SgNB 110-1 and NgNBs 110-2, 110-3, 110-4 may receive the UL RS signals and obtain UL Rx-Tx measurements of the UL RS signals transmitted by the plurality of UEs.

At stage 6, each of the NgNBs 110-2, 110-3, 110-4 (and the SgNB 110-1 in the case of control by another network entity) which obtained UL Rx-Tx measurements at stage 5 sends an XnAP or LSP2 Report for UL Rx-Tx Measurements to the SgNB 110-1 (or the other network entity) with the UL Rx-Tx measurements, e.g., for UL RS signals from the UE 105 and/or the plurality of UEs. The NgNBs 110-2, 110-3, 110-4 (and SgNB 110-1) may transmit a similar report after each measurement occasion including the UL Rx-Tx measurements obtained for that measurement occasion, e.g., at the second periodic interval.

At stage 7, each of the SgNB 110-1 and NgNBs 110-2, 110-3, 110-4 commences to transmit the DL RS configured at stage 2 and continues to periodically transmit the DL RS until the requested end time or until transmission of the DL RS is canceled or reconfigured by the SgNB 110-1 (or the other network entity). The DL RS signals, for example, may be Positioning Reference Signals, Tracking Reference Signals, or both. The DL RS signals transmitted by the SgNB 110-1 and NgNBs 110-2, 110-3, 110-4 may be received and used by the UE 105 to obtain RSTD measurements for OTDOA as discussed in FIG. 3 and/or to obtain DL Rx-Tx measurements as described later for stage 8. The RSTD measurements for OTDOA location determination by the UE 105 may be obtained at a greater frequency than Rx-Tx measurements for determination of RTTs. Accordingly, the DL RS transmissions by the SgNB 110-1 and NgNBs 110-2, 110-3, 110-4 may occur at a first periodic interval for the OTDOA location determination, while the DL Rx-Tx measurements by UE 105 and the UL Rx-Tx measurements of the UL RS signals obtained by the SgNB 110-1 and NgNBs 110-2, 110-3, 110-4 at stage 5 may be performed at a second periodic interval, where the first periodic interval is shorter than the second periodic interval.

At stage 8, the UE 105 obtains DL Rx-Tx measurements of the DL RS signals transmitted at stage 7. The DL Rx-Tx measurements may be obtained at each of the periodic measurement occasions. As discussed for stage 7, the determination of RTTs may have a lower frequency than the OTDOA location determination, which also may use the DL RS transmissions from stage 7. Accordingly, the UE 105 may not obtain DL Rx-Tx measurements for every DL RS transmission occasion, which may occur at the first periodic interval, but may obtain the DL Rx-Tx measurements, e.g., at the second periodic interval, where the first periodic interval is shorter than the second periodic interval. In one implementation, a plurality of UEs may receive and obtain DL Rx-Tx measurements of the DL RS signals transmitted at stage 7 and may provide the DL Rx-Tx measurements to the SgNB 110-1 (or the other network entity).

At stage 9, the UE 105 may optionally send an RRC or LSP3 Report for DL Rx-Tx measurements to the SgNB 110-1 (or the other network entity) after each DL Rx-Tx measurement occasion and may include the DL Rx-Tx measurements obtained for each gNB 110 for that measurement occasion. The RRC or LSP3 Report for DL Rx-Tx measurements may be used by the SgNB 110-1 (or the other network entity) to determine an RTT for each gNB 110 at stage 10 (e.g., as described for FIG. 4). Accordingly, if the SgNB 110-1 (or the other network entity) does not determine the RTT for each gNB 110 at stage 10, then the transmission of the RRC or LSP3 Report for DL Rx-Tx measurements to the SgNB 110-1 for stage 9 is unnecessary.

At stage 10, the SgNB 110-1 (or the other network entity) may optionally determine an RTT between UE 105 and each gNB 110 based on the UL Rx-Tx measurements received from the gNBs 110 at stage 6 (or obtained at stage 5 in the case of the SgNB 110-1) and the DL Rx-Tx measurements received from the UE 105 at stage 9. The RTT measurements may be determined as discussed for FIG. 4. The RTT for each gNB 110 may be determined for each periodic measurement occasion. In addition, the SgNB 110-1 (or the other network entity) may optionally determine an RTT between each of a plurality of UEs and each gNB 110 based on UL Rx-Tx measurements received for each of the plurality of UEs from gNBs 110 at stage 6 and DL Rx-Tx measurements for gNB s 110 received from each of the plurality of UEs at stage 8.

At stage 11, the SgNB 110-1 (or the other network entity) sends location information to the UE 105 in an RRC or LSP3 Report for RTTs or UL Rx-Tx measurements to the UE 105. The location information in the RRC or LSP3 Report, for example, may include the RTTs for UE 105 determined in stage 10, if performed, or may include the UL Rx-Tx measurements for UE 105 received at stage 6 (or obtained at stage 5 in the case of the SgNB 110-1).

At stage 12, the UE 105 obtains RTT measurements for SgNB 110-1 and NgNB s 110-2, 110-3, and 110-4 based on the location information received at stage 11. For example, the UE 105 may obtain the RTT measurements based on receiving the RTTs from SgNB 110-1 (or the other network entity) in stage 11 or based on determining the RTT measurements using the UL Rx-Tx measurements received from the SgNB 110-1 (or the other network entity) in stage 11 and the DL Rx-Tx measurements obtained by the UE 105 at stage 8, e.g., as discussed for FIG. 4.

Figure 6:
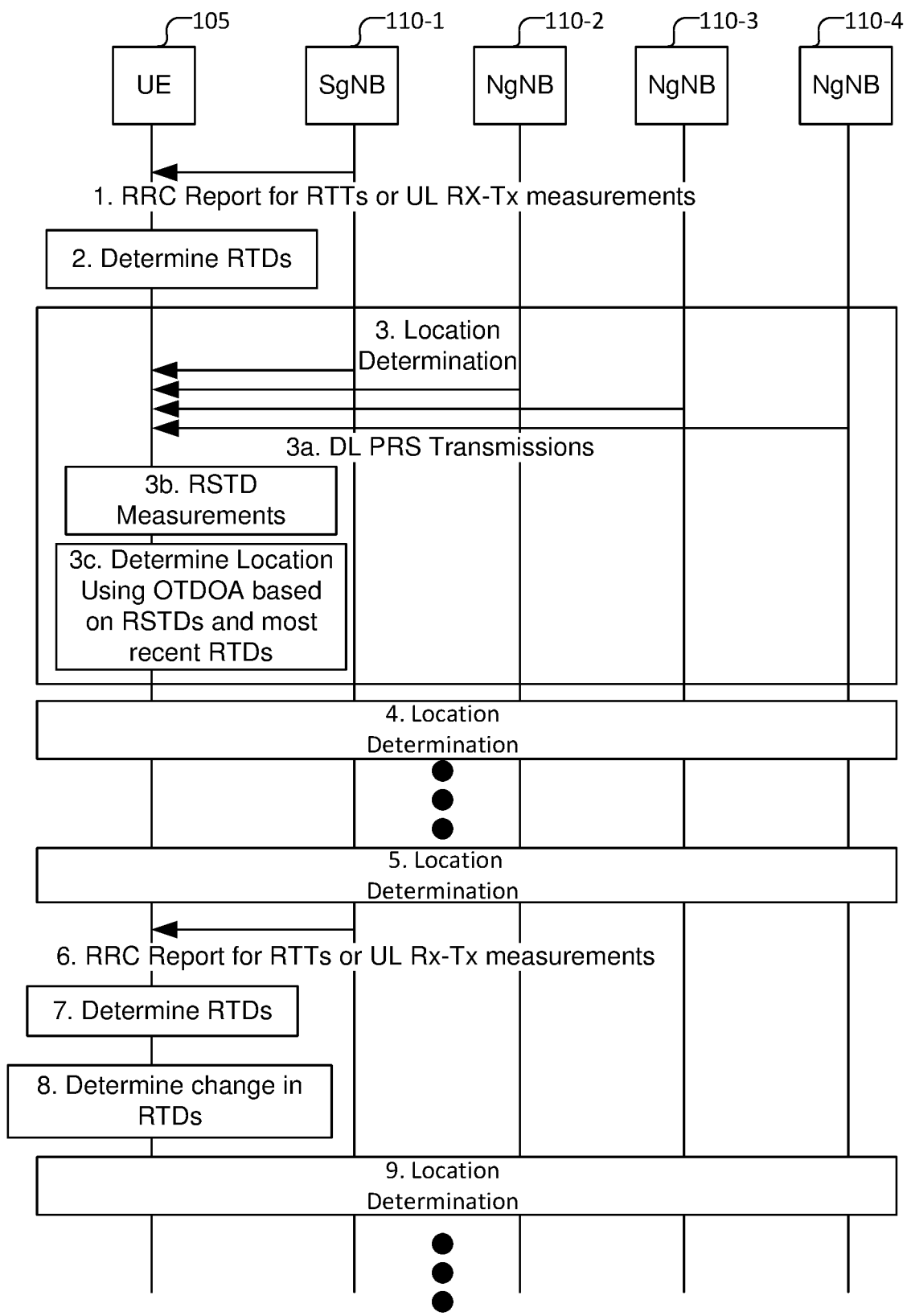
FIG. 6 shows a procedure to support periodic location determination by the UE using UE based OTDOA.

FIG. 6 shows a procedure to support periodic location determination by UE 105 using, e.g., UE based OTDOA. The UE based OTDOA location determination is performed at a first periodic interval using RTDs that are determined by the UE at a second periodic interval, where the first periodic interval is shorter than the second periodic interval. The RTDs may be determined using the RTT measurements determined according to the procedure illustrated in FIG. 5.

At stage 1 in FIG. 6, the SgNB 110-1 (or an other network entity such as another gNB 110, LMC 140, LMF 152, or SLP 153) sends location information to the UE 105 in an RRC or LSP3 Report for RTTs or UL Rx-Tx measurements to the UE 105, as discussed at stage 11 of FIG. 5. The UE 105 then obtains RTT measurements for SgNB 110-1 and NgNBs 110-2, 110-3, and 110-4 based on the location information, e.g., based on receiving the RTTs from SgNB 110-1 (or the other network entity) or based on determining the RTT measurements using the UL Rx-Tx measurements received from the SgNB 110-1 (or the other network entity) and DL Rx-Tx measurements obtained by the UE 105, e.g., as discussed at stage 12 in FIG. 5.

At stage 2, the UE 105 determines (e.g., updates) RTDs for pairs of gNBs 110 using the RTT measurements obtained at stage 1 and previously measured RSTDs for the pairs of gNBs 110, e.g., which may be RSTDs measured in an immediately preceding location determination stage, such as is discussed at sub-stage 3b. If there is not an immediately preceding location determination stage, e.g., stage 2 is the first RTD determination in the location determination procedure, then stage 2 includes the UE 105 measuring RSTDs for pairs of gNBs 110 from the DL RS signals transmitted by the gNBs 110-1, 110-2, 110-3, 110-4. The RTDs may be determined, e.g., as described for FIG. 3. The RTD determination is performed periodically, e.g., as illustrated by stages 2 and 7, based on RTT measurements. The RTT measurement, and thus, RTD determination, requires greater network resources and is relatively slow and has greater latency than UE based OTDOA location determination, and therefore occurs less frequently than the OTDOA location determination.

At stage 3, the UE 105 performs a location determination based on OTDOA. The UE 105 location determination is performed periodically, e.g., as illustrated by stages 3, 4 and 5, and 9, at the first periodic interval, whereas the RTD determination is performed periodically, e.g., as illustrated by stages 2 and 7, at the second periodic interval, which is longer than the first periodic interval. As illustrated in stage 3, each UE based location determination includes a number of sub-stages.

At sub-stage 3a, each of the NgNBs 110-2, 110-3, 110-4, and SgNB 110-1 transmits a DL RS. The DL RS signals, for example, may be Positioning Reference Signals, Tracking Reference Signals, or both. The DL RS signals may be periodically transmitted by the gNBs 110, e.g., at the first periodic interval. In some implementations, the DL RS signals transmitted at sub-stage 3a in FIG. 6 may be the same as the DL RS signals shown at stage 7 in FIG. 5.

At sub-stage 3b, the UE 105 measures RSTDs for pairs of gNBs 110 from the DL RS signals transmitted at sub-stage 3a.

At sub-stage 3c, the UE 105 determines the location of the UE 105 using OTDOA based on the RSTDs measured at sub-stage 3b and the most recent RTDs, e.g., the RTDs determined at stage 2. The determination may be as described for FIG. 3.

Since the UE 105 may need to measure a DL RS from each of many gNBs 110 at stage 3b in order to ensure accurate location determination for UE 105 at stage 3c, each gNB 110 may employ "time separation" of the DL RSs by transmitting a DL RS at a different time to some or all of the other gNBs 110. This may enable UE 105 to measure just one DL RS at any particular time, and avoid UE 105 measuring two or more DL RSs simultaneously, which may be difficult or impossible for some UEs. In one embodiment, this may be achieved by configuring a common set of RS transmission (or positioning) occasions in all gNBs 110, during each of which only some gNBs 110 (e.g., one gNB 110 or a few gNBs 110) transmit a DL RS while the remaining gNBs 110 mute DL RS transmission (by transmitting no DL signal in the frequency range assigned for DL RS transmission) to reduce interference to gNBs 110 that are transmitting a DL RS. Interference to DL RSs may also be reduced by employing "frequency separation" in which different DL RS s are transmitted in different non-overlapping frequency ranges, or "code separation" in which different DL RSs are encoded according to different (e.g., orthogonal.) code sequences at a bit, chip, symbol or other physical level.

At stages 4 and 5, the UE 105 performs additional location determinations based on OTDOA. The location determinations at stages 4 and 5 include sub-stages as illustrated in stage 3, including DL PRS transmissions by the gNBs 110, RSTD measurements of pairs of gNBs 110 by the UE 105 and determining the location of the UE 105 using OTDOA based on the measured RSTDs and the most recent RTDs, e.g., the RTDs determined at stage 2. The UE 105 may perform location determination based on OTDOA at a periodic interval that is shorter than the periodic interval for determining the RTDs. The UE 105 location determination, as illustrated in stages 3, 4, and 5 is performed periodically, at the first periodic interval, which is shorter than the second periodic interval at which the RTDs are determined, as illustrated by stages 2 and 7.

At stage 6 in FIG. 6, the SgNB 110-1 (or the other network entity) sends another RRC or LSP3 Report with location information to the UE 105, such as measured RTTs for the gNBs 110 or UL Rx-Tx measurements from the gNBs 110, as discussed at stage 1 of FIG. 6. The UE 105 obtains the RTT measurements for the gNBs 110 based on the location information provided by the SgNB 110-1 (or the other network entity), e.g., based on receiving the RTTs from SgNB 110-1 (or the other network entity) or based on determining the RTT measurements using the UL Rx-Tx measurements received from the SgNB 110-1 (or the other network entity) and DL Rx-Tx measurements obtained by the UE 105 (e.g. as described for stage 12 of FIG. 5).

At stage 7, the UE 105 determines new (or updated) RTDs for each pair of gNBs 110 using the RTT measurements obtained at stage 6, as well as previously measured RSTDs for the pairs of gNBs 110, e.g., which may be the RSTDs measured in the immediately previous location determination, e.g., at stage 5. The UE 105 periodically determines the RTDs for each pair of gNBs 110 at the second periodic interval, as illustrated by stages 2 and 7. The RTDs may be determined, e.g., as described for FIG. 3.

At stage 8, the UE 105 may determine a rate of change in the RTD for each pair of gNBs 110. The UE 105, for example, compares a current RTD, e.g., as determined at stage 7, with immediately preceding RTDs, e.g., as determined at stage 2, for each pair of gNBs 110, and thus, determines a rate of change in each RTD at the second periodic intervals. Based on the rate of RTD change for each pair of gNBs 110, the UE 105 determines whether to use the gNB 110 pair, including the gNB 110 pair's RTD and RSTDs in subsequent location determination stages. For example, the UE 105 may determine that the rate of RTD change for a gNB 110 pair is excessive, e.g., the rate of RTD change is above a first threshold, or unpredictable, e.g., based on a statistical analysis, and, accordingly, may not use the most recent RTD for the gNB 110 pair, or RSTDs for the gNB 110 pair, in the location determination of the UE 105. The UE 105 may determine that the rate of RTD change for a gNB 110 pair is small, e.g., the rate of RTD change is below a second threshold, and, accordingly, may use the most recent RTD for the gNB 110 pair without adjustment in the location determination of the UE 105. The UE 105 may also determine that the rate of RTD change for a gNB 110 pair indicates that the RTD should be adjusted based on previous RTDs, e.g., the rate of change is below the first threshold but above the second threshold, and, accordingly, may determine the most recent RTD for the gNB 110 pair based on the most recently determined RTD for the gNB 110 pair, e.g., as determined in stage 7, and the rate of change of the RTD for the gNB 110 pair, e.g., as determined in stage 8. For example, the determined RTD for a gNB 110 pair, e.g., as determined at stage 7, may be adjusted, e.g., using a moving weighted average or by calculating a first (and second) order rate of change and by using these to predict a later RTD. By way of example, for location determination, the most recent RTD may be determined as:

$$RTD_{most\_recent} = RTD_{determined} + k1*t + k2*t^2 \quad (Eq.\ 6)$$

where $RTD_{determined}$ is the most recently determined RTD, e.g., as in stage 7, k1 and k2 are first and second order rates of change and t is the time interval since the RTD was last determined, e.g., at stage 7.

At stage 9, the UE 105 continues to perform the periodic location determination based on OTDOA, as discussed in stage 3, using the most recent RTDs as determined in stages 7 and 8.

In one embodiment of FIG. 6, UE 105 may obtain "additional measurements" as part of sub-stage 3b for stage 3 and as part of corresponding sub-stages for stages 4, 5 and 9, which may be used by UE at sub-stage 3c for location determination along with the RSTD and RTD measurements. As an example, the additional measurements may comprise or include sensor measurements (e.g., measurements of UE 105 change of location, velocity, change of velocity and/or acceleration). The additional measurements may be useful to enable UE 105 to determine a location of UE 105 when UE 105 is moving while obtaining the RSTD measurements at sub-stage 3b. For example, the additional measurements may enable UE 105 to determine the relative location of UE 105 at which each RSTD measurement was obtained by UE 105, which may help avoid errors caused by assuming that the RSTD location measurements at sub-stage 3b all correspond to the same location of UE 105. This may enable location of UE 105 by UE 105 at sub-stage 3c with higher reliability and accuracy.

In one implementation, there may be a plurality of UEs in addition to UE 105 which are performing UE based OTDOA location with RTT assistance from the SgNB 110-1 or from an other network entity (e.g. another gNB 110, LMC 140, LMF 152 or SLP 153) in a manner similar to that described for UE 105 in association with FIGS. 5 and 6. This plurality of UEs may be nearby to UE 105 and able to transmit UL RSs to, and receive and measure DL RSs from, the same set of gNBs 110 that are used to support location of UE 105. Specifically, and as described above for stages 5, 6, 8 and 10 for FIG. 5: (i) each UE in this plurality of UEs may transmit UL RS signals; (ii) the SgNB 110-1 and NgNBs 110-2, 110-3, 110-4 may then obtain UL Rx-Tx measurements for these UL RS signals and may send the UL Rx-Tx Measurements to the SgNB 110-1 or to the other network entity; (iii) each UE in the plurality of UEs may obtain DL Rx-Tx measurements of DL RS signals transmitted by gNB s 110 as at stage 7 in FIG. 5 and may provide the DL Rx-Tx measurements to the SgNB 110-1 or to the other network entity; and (iv) the SgNB 110-1 or the other network entity may determine an RTT between each of the plurality of UEs and each gNB 110 based on the UL Rx-Tx measurements received in (ii) and the DL Rx-Tx measurements received in (iii). In one aspect of this implementation, the SgNB 110-1 or the other network entity may send the RTTs determined in (iv) to the plurality of UEs, where each UE in the plurality of UEs receives only the RTTs which apply to this UE and does not receive RTTs for other UEs (e.g. similarly to stage 1 in FIG. 6). Each UE in the plurality of UEs may then determine RTDs between pairs of gNBs 110, similarly to stage 2 in FIG. 6, and may provide the determined RTDs to the SgNB 110-1 or to the other network entity, which may combine the RTDs received from all UEs (e.g. using averaging or weighted averaging) to improve the accuracy of the RTDs, and may provide the improved RTDs to UE 105 and to each UE in the plurality of UEs. The improved RTDs may enable improved location accuracy for UE 105 (e.g. at stages 3, 4, 5 and 9 in FIG. 6) as well as improved location accuracy for each UE in the plurality of UEs.

In another aspect of the above implementation, each UE in the plurality of UEs as well as UE 105 may provide RSTD measurements for pairs of gNBs 110 (e.g. as obtained at sub-stage 3b in FIG. 6 in the case of UE 105) to the SgNB 110 or to the other network entity, which may use the RSTD measurements for each UE and the RTTs for each UE (e.g. as determined in (iv) above) to determine RTDs between pairs of gNBs 110 based on the measurements for each UE. For any pair of gNBs 110, this may result in a separate RTD with respect to each UE which, for different UEs, may be similar to one another but not necessarily identical. The SgNB 110 or the other network entity may then combine the RTDs for each pair of gNBs 110, that were determined with respect to each UE, across all UEs (e.g. using averaging or weighted averaging) to improve the accuracy of the RTDs and may then return the improved RTDs (for some or all pairs of gNBs 110) to UE 105 and each UE in the plurality of UEs. The improved RTDs may enable improved location accuracy for UE 105 (e.g. at stage 3, 4, 5 and 9 in FIG. 6) as well as improved location accuracy for each UE in the plurality of UEs.

Figure 7:
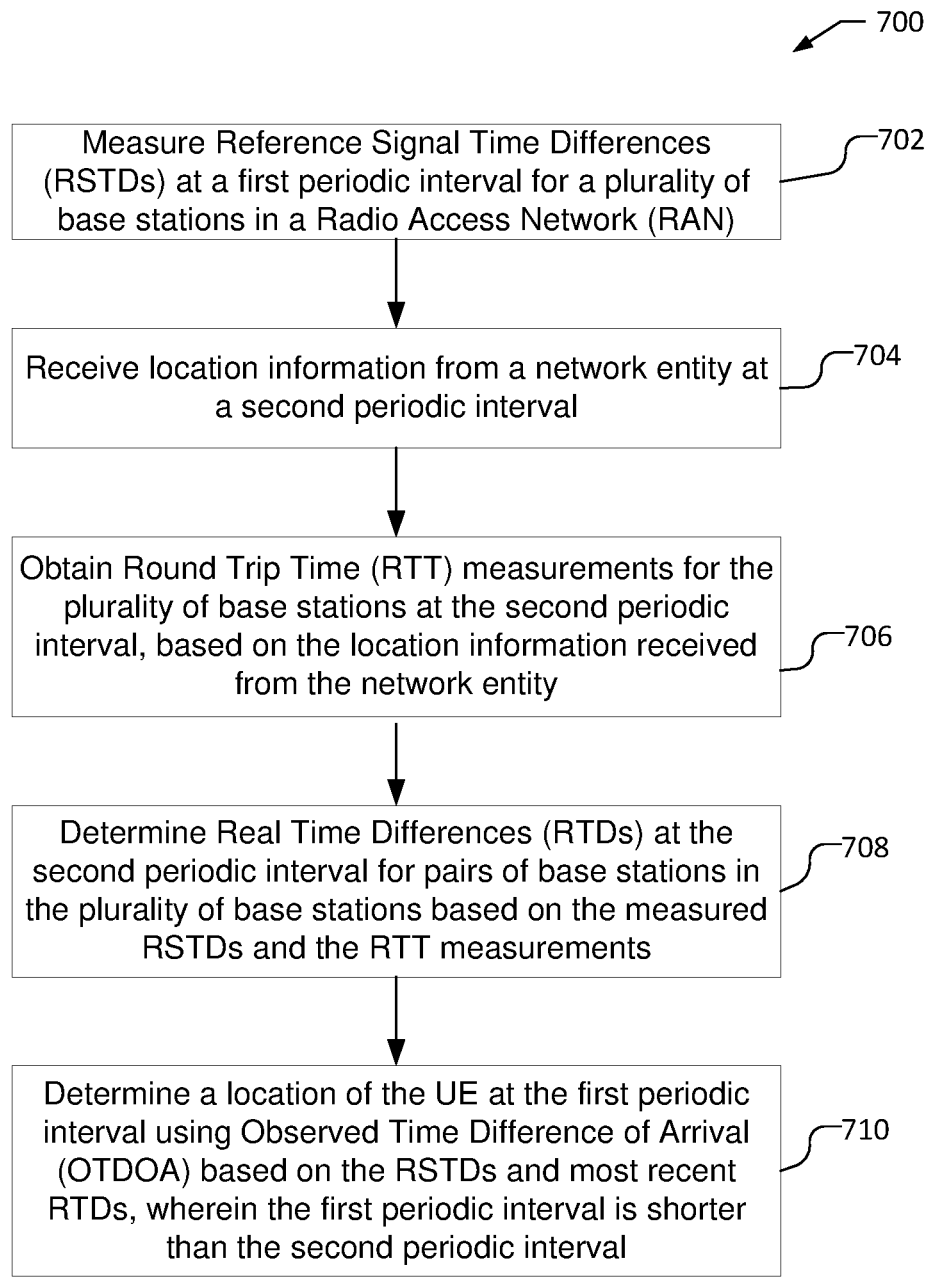
FIG. 7 shows a process flow illustrating a method for locating a user equipment (UE) performed by the UE.

FIG. 7 shows a process flow 700 illustrating a method for locating a user equipment (UE), such as the target UE 105, performed by the UE.

Process flow 700 may start at block 702, where Reference Signal Time Differences (RSTDs) are measured at a first periodic interval for a plurality of base stations in a Radio Access Network (RAN), e.g., as described at stage 3 and sub-stage 3b in FIG. 6. At block 704, location information is received from a network entity at a second periodic interval, e.g., as described at stage 11 in FIG. 5 and stages 1 and 6 in FIG. 6. At block 706, Round Trip Time (RTT) measurements are obtained for the plurality of base stations at the second periodic interval, based on the location information received from the network entity, e.g., as described at stage 12 in FIG. 5 and stages 1 and 6 in FIG. 6. At block 708, Real Time Differences (RTDs) are determined at the second periodic interval for pairs of base stations in the plurality of base stations based on the measured RSTDs and the RTT measurements, e.g., as described at stages 2 and 7 in FIG. 6. At block 710, a location of the UE is determined at the first periodic interval using Observed Time Difference of Arrival (OTDOA) based on the RSTDs and most recent RTDs, where the first periodic interval is shorter than the second periodic interval, e.g., as described at stages 3, 4, 5, and 9 in FIG. 6.

In one implementation, the UE transmits uplink (UL) signals at the second periodic interval, where the UL signals enable UL Receive Time-Transmission Time (Rx-Tx) measurements by each of the plurality of base stations, and where the location information is based on the UL Rx-Tx measurements, e.g., as described at stages 4 and 5 in FIG. 5. The UE may further perform downlink (DL) Rx-Tx measurements at the second periodic interval of downlink (DL) signals received from each of the plurality of base stations, e.g., as described at stage 8 in FIG. 5. In one implementation, the location information may comprise the UL Rx-Tx measurements, and the UE may further determine the RTT measurements at the second periodic interval based on the UL Rx-Tx measurements and the DL Rx-Tx measurements, where obtaining the RTT measurements is based on determining the RTT measurements, e.g., as described at stage 12 in FIG. 5 and stages 1 and 6 in FIG. 6.

In one implementation, the UE may send the DL Rx-Tx measurements to the network entity, where the DL Rx-Tx measurements enable determination of the RTT measurements by the network entity based on the DL Rx-Tx measurements and the UL Rx-Tx measurements, where the location information comprises the RTT measurements, and where obtaining the RTT measurements is based on receiving the RTT measurements, e.g., as described at stages 9, 10, 11, and 12 in FIG. 5 and stages 1 and 6 in FIG. 6.

In one implementation, the UE receives from the network entity or from a serving base station a request to transmit the UL signals at the second periodic interval, e.g., as described at stage 3 of FIG. 5. In one implementation, the UE may further receive from the network entity a request to send the DL Rx-Tx measurements to the network entity, e.g., as described at stage 3 of FIG. 5.

In one implementation, the UE transmits a request to the network entity to send the location information to the UE at the second periodic interval, where the location information is received in response to the request for the location information, e.g., as described at stage 1 of FIG. 5.

In one implementation, the UL signals may be Positioning Reference Signals, Sounding Reference Signals, or both, and the DL signals may be Positioning Reference Signals, Tracking Reference Signals, or both, e.g., as described at stages 4 and 7 of FIG. 5.

In one implementation, the RAN is a Next Generation RAN (e.g. NG-RAN 112) supporting New Radio (NR) wireless access for the UE. The network entity may be a serving NR Node B (gNB) for the UE (e.g. SgNB 110-1), a Location Management Component (e.g. LMC 140), a Location Management Function (e.g. LMF 152), or a Secure User Plane Location (SUPL) Location Platform (e.g. SLP 153).

In one implementation, the UE may determine a rate of change in the RTD for each pair of base stations at the second periodic interval, e.g., as discussed at stage 8 in FIG. 6. For each pair of base stations, the UE may determine one of (i) the rate of change in the RTD is above a first threshold and the RTD is not used in the determination of the location of the UE, (ii) the rate of change in the RTD is below the first threshold and above a second threshold and the most recent RTD is determined based on the most recently determined RTD for the pair of base stations and the rate of change in the RTD, or (iii) the rate of change in the RTD is below the second threshold and the most recent RTD is a most recently determined RTD for the pair of base stations, e.g., as discussed at stage 8 in FIG. 6.

Figure 8:
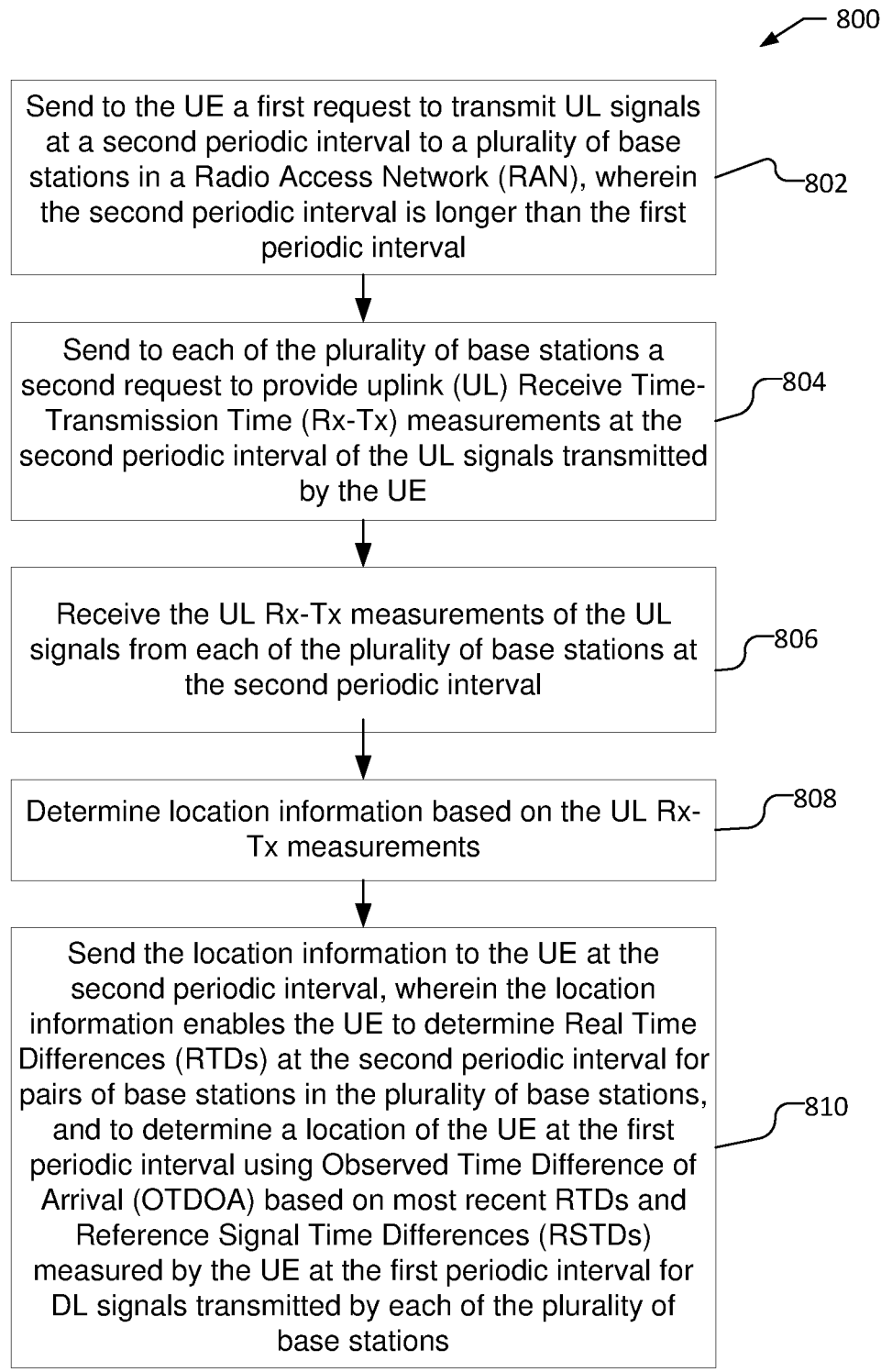
FIG. 8 shows a process flow illustrating a method for supporting location of a user equipment (UE) performed by a network entity.

FIG. 8 shows a process flow 800 illustrating a method for supporting location of a user equipment (UE), such as the target UE 105, at a first periodic interval, performed by a network entity, which may be, e.g., SgNB 110-1, LMC 140, LMF 152 or SLP 153.

Process flow 800 may start at block 802, where a first request is sent to the UE to transmit UL signals at a second periodic interval to a plurality of base stations in a Radio Access Network (RAN), where the second periodic interval is longer than the first periodic interval, e.g., as described at stage 3 in FIG. 5. At block 804, a second request is sent to each of the plurality of base stations to provide uplink (UL) Receive Time-Transmission Time (Rx-Tx) measurements at the second periodic interval of the UL signals transmitted by the UE, e.g., as described at stage 2 in FIG. 5. At block 806, the UL Rx-Tx measurements of the UL signals are received from each of the plurality of base stations at the second periodic interval, e.g., as described at stage 6 in FIG. 5. At block 808, location information is determined based on the UL Rx-Tx measurements, e.g., as described at stages 10 and 11 in FIG. 5. At block 810, the location information is sent to the UE at the second periodic interval, where the location information enables the UE to determine Real Time Differences (RTDs) at the second periodic interval for pairs of base stations in the plurality of base stations, and to determine a location of the UE at the first periodic interval using Observed Time Difference of Arrival (OTDOA) based on the most recent RTDs and Reference Signal Time Differences (RSTDs) measured by the UE at the first periodic interval for DL signals transmitted by each of the plurality of base stations, e.g., as described at stages 11 and 12 in FIG. 5 and stages 1, 2, 3, 4, 5, 6, 7, and 9 of FIG. 6.

In one implementation, the location information may comprise the UL Rx-Tx measurements, e.g., as described at stage 11 in FIG. 5 and stages 1 and 6 of FIG. 6. In one implementation, the UE obtains DL Rx-Tx measurements for each of the plurality of base stations based on the DL signals transmitted by each of the plurality of base stations, where the UE determines RTT measurements for the plurality of base stations at the second periodic interval based on the UL Rx-Tx measurements and the DL Rx-Tx measurements, and where the UE determines the RTDs based on the RTT measurements and the RSTD measurements, e.g., as described at stages 8, and 12 in FIG. 5 and stages 1, 2, 6, and 7 of FIG. 6.

In one implementation, DL Rx-Tx measurements are received from the UE for the DL signals transmitted by each of the plurality of base stations, e.g., as described at stage 9 in FIG. 5. In this implementation, the RTT measurements may be determined for the plurality of base stations based on the DL Rx-Tx measurements and the UL Rx-Tx measurements, where the location information comprises the RTT measurements, e.g., as described at stages 10 and 11 in FIG. 5 and stages 1 and 6 of FIG. 6. In this implementation, the UE may determine the RTDs based on the RTT measurements and the RSTD measurements, e.g., as described at stages 2 and 7 of FIG. 6. In this implementation, a request may be sent to the UE to send the DL Rx-Tx measurements, e.g., as described at stage 3 in FIG. 5.

In one implementation, a request is received from the UE to send the location information to the UE at the second periodic interval, where the location information is sent in response to the request for the location information, e.g., as described at stage 1 in FIG. 5.

In one implementation, the UL signals comprise Positioning Reference Signals, Sounding Reference Signals, or both, and the DL signals comprise Positioning Reference Signals, Tracking Reference Signals, or both, e.g., as described at stages 4 and 7 in FIG. 5.

In one implementation, the RAN is a Next Generation RAN (e.g. NG-RAN 112) supporting New Radio (NR) wireless access for the UE. For example, the network entity may be a serving NR Node B (e.g., SgNB 110-1) for the UE, a Location Management Component (e.g. LMC 140), a Location Management Function (e.g., LMF 152), or a Secure User Plane Location (SUPL) Location Platform (e.g., SLP 153). In one implementation, the network entity is the serving gNB for the UE, where the serving gNB is one of the base stations in the plurality of base stations.

Figure 9:
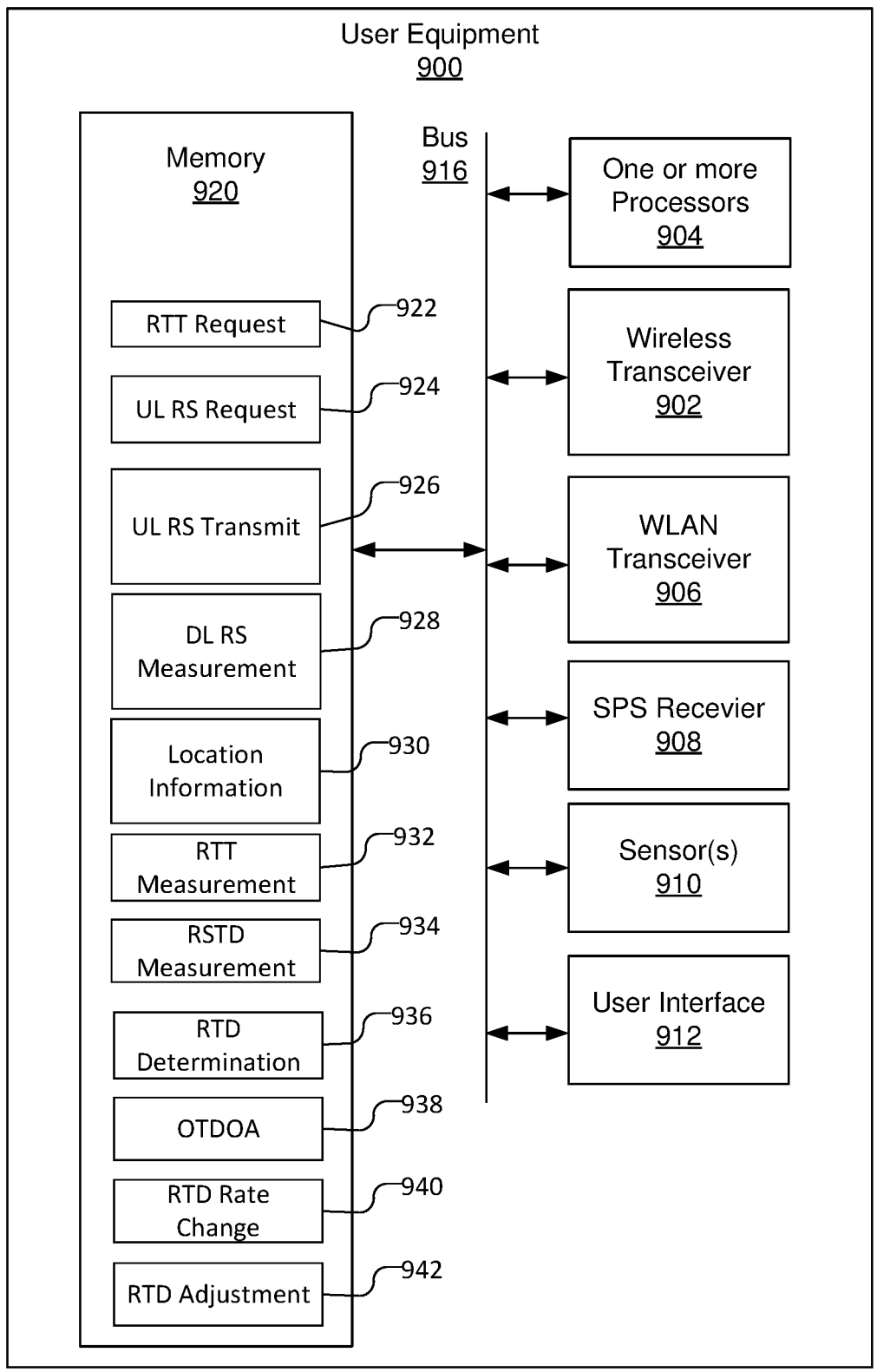
FIG. 9 is a block diagram of an embodiment of a UE that supports UE based OTDOA.

FIG. 9 is a diagram illustrating an example of a hardware implementation of a User Equipment (UE) 900, such as UE 105 shown in FIGS. 1, 2, 3, 5 and 6. UE 900 may perform the process flow 700 as described for FIG. 7. The UE 900 may include a wireless transceiver 902 to wirelessly communicate with a base station in a Radio Access Network, such as Serving gNB (SgNB) 110-1, as discussed herein, and shown in FIGS. 1, 2, 3, 5 and 6. The UE 900 may also include additional transceivers, such a wireless local area network (WLAN) transceiver 906, as well as an SPS receiver 908 for receiving and measuring signals from SPS SVs 190 (shown in FIG. 1). The UE 900 may further include one or more sensors 910, such as cameras, accelerometers, gyroscopes, electronic compass, magnetometer, barometer, etc. The UE 900 may further include a user interface 912 that may include e.g., a display, a keypad or other input device, such as virtual keypad on the display, through which a user may interface with the UE 900. The UE 900 further includes one or more processors 904 and memory 920, which may be coupled together with bus 916. The one or more processors 904 and other components of the UE 900 may similarly be coupled together with bus 916, a separate bus, or may be directly connected together or coupled using a combination of the foregoing. The memory 920 may store data and may contain executable code or software instructions that when executed by the one or more processors 904 cause the one or more processors to operate as a special purpose computer programmed to perform the algorithms disclosed herein.

As illustrated in FIG. 9, the memory 920 may include one or more components or modules that may be implemented by the one or more processors 904 to perform the methodologies described herein. While the components or modules are illustrated as software in memory 920 that is executable by the one or more processors 904, it should be understood that the components or modules may be dedicated hardware either in the one or more processors 904 or off the processors. As illustrated, the memory 920 may include an RTT request unit 922 that configures the one or more processors 904 to send, via the wireless transceiver 902, an RRC or LSP3 message to SgNB 110-1 or another network entity requesting periodic RTT measurements. A UL RS request unit 924 configures the one or more processors 904 to receive, via the wireless transceiver 902, an RRC or LSP3 message from SgNB 110-1 or another network entity requesting periodic UL RS transmissions. The UL RS request unit 924 may further configure the one or more processors 904 to receive a request, via the wireless transceiver 902, for periodic DL Rx-Tx measurements from the SgNB 110-1 or another network entity. A UL RS transmit unit 926 configures the one or more processors 904 to transmit the periodic UL RS signals via wireless transceiver 902, which may be, e.g., Positioning Reference Signals, Sounding Reference Signals, or both. A DL RS measurement unit 928 configures the one or more processors 904 to obtain periodic DL Rx-Tx measurements of DL RS signals received from base stations in the RAN via the wireless transceiver 902. The DL RS measurement unit 928 may further configure the one or more processors 904 to send the periodic DL Rx-Tx measurements to the SgNB 110-1 or another network entity via the wireless transceiver 902.

The memory 920 may further include a location information unit 930 that configures the one or more processors 904 to receive location information via wireless transceiver 902 from the SgNB 110-1 or another network entity. The location information may be in an RRC or LSP3 report and may include, e.g., the measured RTTs determined by the network entity, such as the SgNB 110-1 or another network entity, such as LMC 140, LMF 152, or SLP 153, or may include UL Rx-TX measurements obtained from base stations in the RAN. The one or more processors 904 may further be configured to transmit a request to the SgNB 110-1 or another network entity to send the location information to the UE at a periodic interval. An RTT measurement unit 932 configures the one or more processors 904 to obtain RTT measurements from the location information, e.g., as either the measured RTTs received from the SgNB 110-1 or another network entity or by determining the measured RTTs using the received UL Rx-TX measurements and the DL Rx-Tx measurements obtained by the UE 900. An RSTD measurement unit 934 configures the one or more processors 904 to periodically measure RSTDs from DL RS signals received from a plurality of base stations via the wireless transceiver 902. The RSTD measurement unit 934 configures the one or more processors 904 to measure RSTDs at a first periodic interval while the one or more processors 904 are configured to transmit UL RS signal, obtain DL Rx-Tx measurements, and determine RTT measurements at a second periodic interval, where the first periodic interval is shorter than the second periodic interval. An RTD determination unit 936 configures the one or more processors 904 to determine RTDs for pairs of base stations, e.g., at the second periodic interval, based on the measured RSTDs and the RTT measurements. An OTDOA unit 938 configures the one or more processors 904 to determine a location of the UE 900, e.g., at the first periodic interval, using OTDOA based on the RSTDs, and the most recent RTDs.

The memory 920 may further include an RTD rate change unit 940, which may configure the one or more processors 904 to determine the rate of change in RTDs, e.g., using new determined RTDs and previously acquired RTDs for each pair of base stations, and to determine whether to use or not use the new RTD in OTDOA location determination, or to adjust the RTD before using in OTDOA location determination. For example, one or more thresholds may be used to determine whether the RTDs may be used for OTDOA location determination with or without adjustment. An RTD adjustment unit 942 may configure the one or more processors 904 to adjust each RTD based on a most recently determined RTD and the determined rate of change in the RTD.

The methodologies described herein may be implemented by various means depending upon the application. For example, these methodologies may be implemented in hardware, firmware, software, or any combination thereof. For a hardware implementation, the one or more processors 904 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 900 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g., memory 920) and executed by one or more processors 904, causing the one or more processors 904 to operate as a special purpose computer programmed to perform the techniques disclosed herein. Memory may be implemented within the one or processors 904 or external to the one or more processors 904. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 900 may be stored as one or more instructions or code on a non-transitory computer-readable storage medium such as memory 920. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 900 may be provided as signals on transmission media included in a communication apparatus. For example, a communication apparatus comprising part or all of UE 900 may include a transceiver having signals indicative of instructions and data. The instructions and data are stored on non-transitory computer readable media, e.g., memory 920, and are configured to cause the one or more processors 904 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a user equipment (UE), such as UE 900, capable of performing location determination of the UE, may include a means for measuring Reference Signal Time Differences (RSTDs) at a first periodic interval for a plurality of base stations in a Radio Access Network (RAN), which may be, e.g., the wireless transceiver 902 and one or more processors 904 with dedicated hardware or implementing executable code or software instructions in memory 920 such as the RSTD measurement unit 934. A means for receiving location information from a network entity at a second periodic interval may be, e.g., the wireless transceiver 902 and one or more processors 904 with dedicated hardware or implementing executable code or software instructions in memory 920 such as the location information unit 930. A means for obtaining Round Trip Time (RTT) measurements for the plurality of base stations at the second periodic interval, based on the location information received from the network entity may be, e.g., the wireless transceiver 902 and one or more processors 904 with dedicated hardware or implementing executable code or software instructions in memory 920 such as the RTT measurement unit 932. A means for determining Real Time Differences (RTDs) at the second periodic interval for pairs of base stations in the plurality of base stations based on the measured RSTDs and the RTT measurements may be, e.g., the one or more processors 904 with dedicated hardware or implementing executable code or software instructions in memory 920 such as the RTD determination unit 936. A means for determining a location of the UE at the first periodic interval using Observed Time Difference of Arrival (OTDOA) based on the RSTDs and most recent RTDs, wherein the first periodic interval is shorter than the second periodic interval may be, e.g., the wireless transceiver 902 and one or more processors 904 with dedicated hardware or implementing executable code or software instructions in memory 920 such as the OTDOA unit 938.

In one implementation, the UE may further include a means for transmitting uplink (UL) signals at the second periodic interval, wherein the UL signals enable UL Receive Time-Transmission Time (Rx-Tx) measurements by each of the plurality of base stations, wherein the location information is based on the UL Rx-Tx measurements, which may be, e.g., the wireless transceiver 902 and one or more processors 904 with dedicated hardware or implementing executable code or software instructions in memory 920 such as the UL RS transmit unit 926. A means for performing downlink (DL) Rx-Tx measurements at the second periodic interval of downlink (DL) signals received from each of the plurality of base stations may be, e.g., the wireless transceiver 902 and one or more processors 904 with dedicated hardware or implementing executable code or software instructions in memory 920 such as the DL RS measurement unit 928.

In one implementation, the location information comprises the UL Rx-Tx measurements, and the UE may include a means for determining the RTT measurements at the second periodic interval based on the UL Rx-Tx measurements and the DL Rx-Tx measurements, wherein obtaining the RTT measurements is based on determining the RTT measurements, which may be, e.g., the wireless transceiver 902 and one or more processors 904 with dedicated hardware or implementing executable code or software instructions in memory 920 such as the RTT measurement unit 932.

In one implementation, the UE may further include a means for sending the DL Rx-Tx measurements to the network entity, wherein the DL Rx-Tx measurements enable determination of the RTT measurements by the network entity based on the DL Rx-Tx measurements and the UL Rx-Tx measurements, wherein the location information comprises the RTT measurements, wherein obtaining the RTT measurements is based on receiving the RTT measurements, which may be, e.g., the wireless transceiver 902 and one or more processors 904 with dedicated hardware or implementing executable code or software instructions in memory 920 such as DL RS measurement unit 928.

In one implementation, the UE may further include a means for receiving from the network entity or from a serving base station a request to transmit the UL signals at the second periodic interval, which may be, e.g., the wireless transceiver 902 and one or more processors 904 with dedicated hardware or implementing executable code or software instructions in memory 920 such as UL RS request unit 924.

In one implementation, the UE may further include a means for receiving from the network entity a request to send the DL Rx-Tx measurements to the network entity, which may be, e.g., the wireless transceiver 902 and one or more processors 904 with dedicated hardware or implementing executable code or software instructions in memory 920 such as UL RS request unit 924.

In one implementation, the UE may further include a means for transmitting a request to the network entity to send the location information to the UE at the second periodic interval, wherein the location information is received in response to the request for the location information, which may be, e.g., the wireless transceiver 902 and one or more processors 904 with dedicated hardware or implementing executable code or software instructions in memory 920 such as location information unit 930.

In one implementation, the UE may further include a means for determining a rate of change in the RTD at the second periodic interval for each pair of base stations, which may be, e.g., the one or more processors 904 with dedicated hardware or implementing executable code or software instructions in memory 920 such as RTD rate change unit 940, where for each pair of base stations, it is determined whether one of (i) the rate of change in the RTD is above a first threshold and the RTD is not used in the determination of the location of the UE, (ii) the rate of change in the RTD is below the first threshold and above a second threshold and the most recent RTD is determined based on the most recently determined RTD for the pair of base stations and the rate of change in the RTD, or (iii) the rate of change in the RTD is below the second threshold and the most recent RTD is a most recently determined RTD for the pair of base stations.

Figure 10:
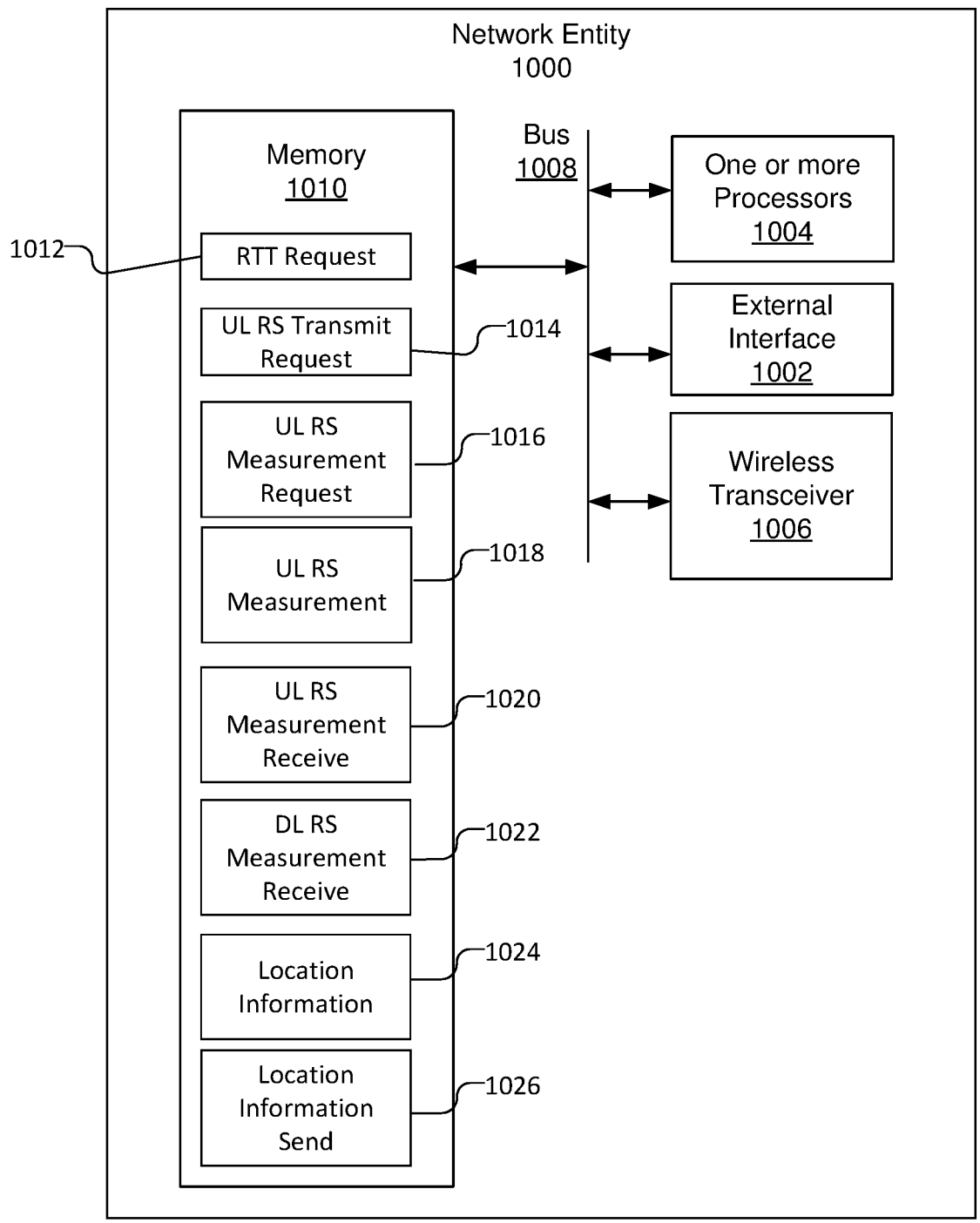
FIG. 10 is a block diagram of an embodiment of a network entity that supports location of a UE using UE based OTDOA.

FIG. 10 is a diagram illustrating an example of a hardware implementation of a network entity 1000 that supports location of a UE, such as UE 105, as discussed herein, and shown or referenced in FIGS. 1, 5 and 6. Network entity 1000 may perform the process flow 800 as described for FIG. 8. The network entity 1000 may be, e.g., a serving base station, such as SgNB 110-1, another gNB 110, LMC 140, LMF 152 or SLP 153, as shown in FIG. 1.

The network entity 1000 includes, e.g., hardware components such as an external interface 1002, which may be a wired or wireless interface capable of connecting to base stations in the RAN, such as NgNBs 110-2, 110-3, 110-4, and SgNB 110-1 if the network entity 1000 is not the SgNB 110-1. The network entity 1000 may further include a wireless transceiver 1006 to wirelessly connect to one or more UEs 105 if the network entity 1000 is the serving base station, e.g., SgNB 110-1. The network entity 1000 includes one or more processors 1004 and memory 1010, which may be coupled together with bus 1008. The memory 1010 may store data and may contain executable code or software instructions that when executed by the one or more processors 1004 cause the one or more processors 1004 to operate as a special purpose computer programmed to perform the procedures and techniques disclosed herein (e.g., such as the process flow 800).

As illustrated in FIG. 10, the memory 1010 includes one or more components or modules that when implemented by the one or more processors 1004 implements the methodologies described herein. While the components or modules are illustrated as software in memory 1010 that is executable by the one or more processors 1004, it should be understood that the components or modules may be dedicated hardware or firmware either in the processors 1004 or off processor.

As illustrated, the memory 1010 may include an RTT request unit 1012 that configures the one or more processors 1004 to receive an RRC or LSP3 message from the UE 105 requesting periodic RTT measurements or location information. A UL RS transmit request unit 1014 configures the one or more processors 1004 to send a message to one or more UEs requesting periodic UL RS transmissions to a plurality of base stations at a second periodic interval, via the wireless transceiver 1006 or external interface 1002. The UL RS transmit request unit 1014 may further configure the one or more processors 1004 to send, via the wireless transceiver 1006 or external interface 1002, a request for periodic DL Rx-Tx measurements, at the second periodic interval, to the one or more UEs. An UL RS measurement request unit 1016 configures the one or more processors 1004 to transmit, via the wireless transceiver 1006 or external interface 1002, to the plurality of base stations a request to provide UL Rx-Tx measurements at the second periodic interval of the UL signals transmitted by the one or more UEs. The UL RS measurement request unit 1016 may further configure the one or more processors 1004 to send a request to the plurality of base stations to transmit periodic DL RS signals to the one or more UEs. An UL RS measurement unit 1018 may configure the one or more processors 1004 to obtain periodic UL Rx-Tx measurements of UL RS signals received from one or more UEs via the wireless transceiver 1006, e.g., if the network entity 1000 is a serving base station. An UL RS measurement receive unit 1020 may configure the one or more processors 1004 to receive the periodic UL Rx-Tx measurements from other base stations in the RAN via the wireless transceiver 1006 or external interface 1002. A DL RS measurement receive unit 1022 may configure the one or more processors 1004 to receive, via the wireless transceiver 1006 or external interface 1002, periodic DL Rx-Tx measurements from one or more UEs.

The memory 1010 may further include a location information unit 1024 that configures the one or more processors 1004 to determine location information based on the UL Rx-Tx measurements. The location information, for example, may be the UL Rx-Tx measurements obtained from other base stations in the RAN and measured by the network entity 1000, if the network entity is SgNB 110-1. In another implementation, the location information unit 1024 may configure the one or more processors 1004 to determine location information as RTT measurements based on UL Rx-Tx measurements and DL Rx-Tx measurements received from one or more UEs. A location information send unit 1026 configures the one or more processors 1004 to send, via the wireless transceiver 1006 or external interface 1002, the location information to the UE 105.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g., memory 1010) and executed by one or more processor units (e.g., processors 1004), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1010, and are configured to cause the one or more processors (e.g., processors 1004) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a network entity, such as network entity 1000, for supporting location determination of a user equipment (UE) at a first periodic interval, may include a means for sending to the UE a first request to transmit UL signals at a second periodic interval to a plurality of base stations in a Radio Access Network (RAN), wherein the second periodic interval is longer than the first periodic interval, which may be, e.g., the external interface 1002 and one or more processors 1004 with dedicated hardware or implementing executable code or software instructions in memory 1010 such as UL RS transmit request unit 1014. A means for sending to each of the plurality of base stations a second request to provide uplink (UL) Receive Time-Transmission Time (Rx-Tx) measurements at the second periodic interval of the UL signals transmitted by the UE may be, e.g., the external interface 1002 and one or more processors 1004 with dedicated hardware or implementing executable code or software instructions in memory 1010 such as UL RS measurement request unit 1016. A means for receiving the UL Rx-Tx measurements of the UL signals from each of the plurality of base stations at the second periodic interval may be, e.g., the external interface 1002 and one or more processors 1004 with dedicated hardware or implementing executable code or software instructions in memory 1010 such as UL RS measurement receive unit 1020. A means for determining location information based on the UL Rx-Tx measurements may be, e.g., the one or more processors 1004 with dedicated hardware or implementing executable code or software instructions in memory 1010 such as location information unit 1024. A means for sending the location information to the UE at the second periodic interval, wherein the location information enables the UE to determine Real Time Differences (RTDs) at the second periodic interval for pairs of base stations in the plurality of base stations, and to determine a location of the UE at the first periodic interval using Observed Time Difference of Arrival (OTDOA) based on most recent RTDs and Reference Signal Time Differences (RSTDs) measured by the UE at the first periodic interval for DL signals transmitted by each of the plurality of base stations. may be, e.g., the external interface 1002 and one or more processors 1004 with dedicated hardware or implementing executable code or software instructions in memory 1010 such as location information send unit 1026.

In one implementation, the network entity may further include a means for receiving DL Rx-Tx measurements from the UE for the DL signals transmitted by each of the plurality of base stations, which may be, e.g., the external interface 1002 and one or more processors 1004 with dedicated hardware or implementing executable code or software instructions in memory 1010 such as UL RS measurement unit 1018. A means for determining RTT measurements for the plurality of base stations based on the DL Rx-Tx measurements and the UL Rx-Tx measurements, wherein the location information comprises the RTT measurements may be, e.g., the one or more processors 1004 with dedicated hardware or implementing executable code or software instructions in memory 1010 such as location information unit 1024.

In one implementation, the network entity may further include a means for sending a request to the UE to send the DL Rx-Tx measurements, which may be, e.g., the external interface 1002 and one or more processors 1004 with dedicated hardware or implementing executable code or software instructions in memory 1010 such as UL RS transmit request unit 1014.

In one implementation, the network entity may further include a means for sending a request to the UE to transmit the UL signals at the second periodic interval, which may be, e.g., the external interface 1002 and one or more processors 1004 with dedicated hardware or implementing executable code or software instructions in memory 1010 such as UL RS transmit request unit 1014.

In one implementation, the network entity may further include a means for receiving a request from the UE to send the location information to the UE at the second periodic interval, wherein the location information is sent in response to the request for the location information which may be, e.g., the external interface 1002 and one or more processors 1004 with dedicated hardware or implementing executable code or software instructions in memory 1010 such as RTT request unit 1012.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

One implementation (1) may be a method performed by a network entity for supporting location of a user equipment (UE) at a first periodic interval, the method comprising: sending to the UE a first request to transmit UL signals at a second periodic interval to a plurality of base stations in a Radio Access Network (RAN), wherein the second periodic interval is longer than the first periodic interval; sending to each of the plurality of base stations a second request to provide uplink (UL) Receive Time-Transmission Time (Rx-Tx) measurements at the second periodic interval of the UL signals transmitted by the UE; receiving the UL Rx-Tx measurements of the UL signals from each of the plurality of base stations at the second periodic interval; determining location information based on the UL Rx-Tx measurements; and sending the location information to the UE at the second periodic interval, wherein the location information enables the UE to determine Real Time Differences (RTDs) at the second periodic interval for pairs of base stations in the plurality of base stations, and to determine a location of the UE at the first periodic interval using Observed Time Difference of Arrival (OTDOA) based on most recent RTDs and Reference Signal Time Differences (RSTDs) measured by the UE at the first periodic interval for DL signals transmitted by each of the plurality of base stations.

There may be some implementations (2) of the above-described method (1) wherein the location information comprises the UL Rx-Tx measurements.

There may be some implementations (3) of the above-described method (2) wherein the UE obtains DL Rx-Tx measurements for each of the plurality of base stations based on the DL signals transmitted by each of the plurality of base stations, wherein the UE determines Round Trip Time (RTT) measurements for the plurality of base stations at the second periodic interval based on the UL Rx-Tx measurements and the DL Rx-Tx measurements, wherein the UE determines the RTDs based on the RTT measurements and the RSTD measurements.

There may be some implementations (4) of the above-described method (1) further comprising: receiving DL Rx-Tx measurements from the UE for the DL signals transmitted by each of the plurality of base stations; and determining RTT measurements for the plurality of base stations based on the DL Rx-Tx measurements and the UL Rx-Tx measurements, wherein the location information comprises the RTT measurements.

There may be some implementations (5) of the above-described method (4) wherein the UE determines the RTDs based on the RTT measurements and the RSTD measurements.

There may be some implementations (6) of the above-described method (4) further comprising: sending a request to the UE to send the DL Rx-Tx measurements.

There may be some implementations (7) of the above-described method (1) further comprising: receiving a request from the UE to send the location information to the UE at the second periodic interval, wherein the location information is sent in response to the request for the location information.

There may be some implementations (8) of the above-described method (1) wherein the UL signals comprise Positioning Reference Signals, Sounding Reference Signals, or both, and wherein the DL signals comprise Positioning Reference Signals, Tracking Reference Signals, or both.

There may be some implementations (9) of the above-described method (1) wherein the RAN is a Next Generation RAN (NG-RAN) supporting New Radio (NR) wireless access for the UE.

There may be some implementations (10) of the above-described method (9) wherein the network entity is a serving NR Node B (gNB) for the UE, a Location Management Component, a Location Management Function, or a Secure User Plane Location (SUPL) Location Platform.

There may be some implementations (11) of the above-described method (10) wherein the network entity is the serving gNB for the UE, wherein the serving gNB is one of the base stations in the plurality of base stations.

One implementation (12) may be a network entity for supporting location determination of a user equipment (UE) at a first periodic interval, the network entity comprising: an external interface configured to communicate with base station in a Radio Access Network (RAN) and one or more UEs; at least one memory; at least one processor coupled to the external interface and the at least one memory, wherein the at least one processor is configured to: send to the UE, via the external interface, a first request to transmit UL signals at a second periodic interval to a plurality of base stations in the Radio Access Network (RAN), wherein the second periodic interval is longer than the first periodic interval; send to each of the plurality of base stations, via the external interface, a second request to provide uplink (UL) Receive Time-Transmission Time (Rx-Tx) measurements at the second periodic interval of the UL signals transmitted by the UE; receive, via the external interface, the UL Rx-Tx measurements of the UL signals from each of the plurality of base stations at the second periodic interval; determine location information based on the UL Rx-Tx measurements; and send, via the external interface, the location information to the UE at the second periodic interval, wherein the location information enables the UE to determine Real Time Differences (RTDs) at the second periodic interval for pairs of base stations in the plurality of base stations, and to determine a location of the UE at the first periodic interval using Observed Time Difference of Arrival (OTDOA) based on most recent RTDs and Reference Signal Time Differences (RSTDs) measured by the UE at the first periodic interval for DL signals transmitted by each of the plurality of base stations.

There may be some implementations (13) of the above-described network entity (12) wherein the location information comprises the UL Rx-Tx measurements.

There may be some implementations (14) of the above-described network entity (13) wherein the UE obtains DL Rx-Tx measurements for each of the plurality of base stations based on the DL signals transmitted by each of the plurality of base stations, wherein the UE determines Round Trip Time (RTT) measurements for the plurality of base stations at the second periodic interval based on the UL Rx-Tx measurements and the DL Rx-Tx measurements, wherein the UE determines the RTDs based on the RTT measurements and the RSTD measurements.

There may be some implementations (15) of the above-described network entity (12) wherein the at least one processor is further configured to: receive, via the external interface, DL Rx-Tx measurements from the UE for the DL signals transmitted by each of the plurality of base stations; and determine RTT measurements for the plurality of base stations based on the DL Rx-Tx measurements and the UL Rx-Tx measurements, wherein the location information comprises the RTT measurements.

There may be some implementations (16) of the above-described network entity (15) wherein the UE determines the RTDs based on the RTT measurements and the RSTD measurements.

There may be some implementations (17) of the above-described network entity (15) wherein the at least one processor is further configured to: send, via the external interface, a request to the UE to send the DL Rx-Tx measurements.

There may be some implementations (18) of the above-described network entity (12) wherein the at least one processor is further configured to: receive, via the external interface, a request from the UE to send the location information to the UE at the second periodic interval, wherein the location information is sent in response to the request for the location information.

There may be some implementations (19) of the above-described network entity (12) wherein the UL signals comprise Positioning Reference Signals, Sounding Reference Signals, or both, and wherein the DL signals comprise Positioning Reference Signals, Tracking Reference Signals, or both.

There may be some implementations (20) of the above-described network entity (12) wherein the RAN is a Next Generation RAN (NG-RAN) supporting New Radio (NR) wireless access for the UE.

There may be some implementations (21) of the above-described network entity (20) wherein the network entity is a serving NR Node B (gNB) for the UE, a Location Management Component, a Location Management Function, or a Secure User Plane Location (SUPL) Location Platform.

There may be some implementations (22) of the above-described network entity (21) wherein the network entity is the serving gNB for the UE, wherein the serving gNB is one of the base stations in the plurality of base stations.

One implementation (23) may be a network entity for supporting location determination of a user equipment (UE) at a first periodic interval, comprising: means for sending to the UE a first request to transmit UL signals at a second periodic interval to a plurality of base stations in a Radio Access Network (RAN), wherein the second periodic interval is longer than the first periodic interval; means for sending to each of the plurality of base stations a second request to provide uplink (UL) Receive Time-Transmission Time (Rx-Tx) measurements at the second periodic interval of the UL signals transmitted by the UE; means for receiving the UL Rx-Tx measurements of the UL signals from each of the plurality of base stations at the second periodic interval; means for determining location information based on the UL Rx-Tx measurements; and means for sending the location information to the UE at the second periodic interval, wherein the location information enables the UE to determine Real Time Differences (RTDs) at the second periodic interval for pairs of base stations in the plurality of base stations, and to determine a location of the UE at the first periodic interval using Observed Time Difference of Arrival (OTDOA) based on most recent RTDs and Reference Signal Time Differences (RSTDs) measured by the UE at the first periodic interval for DL signals transmitted by each of the plurality of base stations.

There may be some implementations (24) of the above-described network entity (23) wherein the location information comprises the UL Rx-Tx measurements.

There may be some implementations (25) of the above-described network entity (24) wherein the UE obtains DL Rx-Tx measurements for each of the plurality of base stations based on the DL signals transmitted by each of the plurality of base stations, wherein the UE determines Round Trip Time (RTT) measurements for the plurality of base stations at the second periodic interval based on the UL Rx-Tx measurements and the DL Rx-Tx measurements, wherein the UE determines the RTDs based on the RTT measurements and the RSTD measurements.

There may be some implementations (26) of the above-described network entity (23) further comprising: means for receiving DL Rx-Tx measurements from the UE for the DL signals transmitted by each of the plurality of base stations; and means for determining RTT measurements for the plurality of base stations based on the DL Rx-Tx measurements and the UL Rx-Tx measurements, wherein the location information comprises the RTT measurements.

There may be some implementations (27) of the above-described network entity (26) wherein the UE determines the RTDs based on the RTT measurements and the RSTD measurements.

There may be some implementations (28) of the above-described network entity (26) further comprising: means for sending a request to the UE to send the DL Rx-Tx measurements.

There may be some implementations (29) of the above-described network entity (23) further comprising: means for receiving a request from the UE to send the location information to the UE at the second periodic interval, wherein the location information is sent in response to the request for the location information.

There may be some implementations (30) of the above-described network entity (23) wherein the UL signals comprise Positioning Reference Signals, Sounding Reference Signals, or both, and wherein the DL signals comprise Positioning Reference Signals, Tracking Reference Signals, or both.

There may be some implementations (31) of the above-described network entity (23) wherein the RAN is a Next Generation RAN (NG-RAN) supporting New Radio (NR) wireless access for the UE.

There may be some implementations (32) of the above-described network entity (31) wherein the network entity is a serving NR Node B (gNB) for the UE, a Location Management Component, a Location Management Function, or a Secure User Plane Location (SUPL) Location Platform.

There may be some implementations (33) of the above-described network entity (32) wherein the network entity is the serving gNB for the UE, wherein the serving gNB is one of the base stations in the plurality of base stations.

One implementation (34) may be a non-transitory storage medium including program code stored thereon, the program code is operable to cause at least one processor in a network entity to support location determination of a user equipment (UE) at a first periodic interval, comprising: program code to send to the UE a first request to transmit UL signals at a second periodic interval to a plurality of base stations in a Radio Access Network (RAN), wherein the second periodic interval is longer than the first periodic interval; program code to send to each of the plurality of base stations a second request to provide uplink (UL) Receive Time-Transmission Time (Rx-Tx) measurements at the second periodic interval of the UL signals transmitted by the UE; program code to receive the UL Rx-Tx measurements of the UL signals from each of the plurality of base stations at the second periodic interval; program code to determine location information based on the UL Rx-Tx measurements; and program code to send the location information to the UE at the second periodic interval, wherein the location information enables the UE to determine Real Time Differences (RTDs) at the second periodic interval for pairs of base stations in the plurality of base stations, and to determine a location of the UE at the first periodic interval using Observed Time Difference of Arrival (OTDOA) based on most recent RTDs and Reference Signal Time Differences (RSTDs) measured by the UE at the first periodic interval for DL signals transmitted by each of the plurality of base stations.

There may be some implementations (35) of the above-described non-transitory storage medium (34) wherein the location information comprises the UL Rx-Tx measurements.

There may be some implementations (36) of the above-described non-transitory storage medium (35) wherein the UE obtains DL Rx-Tx measurements for each of the plurality of base stations based on the DL signals transmitted by each of the plurality of base stations, wherein the UE determines Round Trip Time (RTT) measurements for the plurality of base stations at the second periodic interval based on the UL Rx-Tx measurements and the DL Rx-Tx measurements, wherein the UE determines the RTDs based on the RTT measurements and the RSTD measurements.

There may be some implementations (37) of the above-described non-transitory storage medium (34) further comprising: program code to receive DL Rx-Tx measurements from the UE for the DL signals transmitted by each of the plurality of base stations; and program code to determine RTT measurements for the plurality of base stations based on the DL Rx-Tx measurements and the UL Rx-Tx measurements, wherein the location information comprises the RTT measurements.

There may be some implementations (38) of the above-described non-transitory storage medium (37) wherein the UE determines the RTDs based on the RTT measurements and the RSTD measurements.

There may be some implementations (39) of the above-described non-transitory storage medium (37) further comprising: program code to send a request to the UE to send the DL Rx-Tx measurements.

There may be some implementations (40) of the above-described non-transitory storage medium (34) further comprising: program code to receive a request from the UE to send the location information to the UE at the second periodic interval, wherein the location information is sent in response to the request for the location information.

There may be some implementations (41) of the above-described non-transitory storage medium (34) wherein the UL signals comprise Positioning Reference Signals, Sounding Reference Signals, or both, and wherein the DL signals comprise Positioning Reference Signals, Tracking Reference Signals, or both.

There may be some implementations (42) of the above-described non-transitory storage medium (34) wherein the RAN is a Next Generation RAN (NG-RAN) supporting New Radio (NR) wireless access for the UE.

There may be some implementations (43) of the above-described non-transitory storage medium (42) wherein the network entity is a serving NR Node B (gNB) for the UE, a Location Management Component, a Location Management Function, or a Secure User Plane Location (SUPL) Location Platform.

There may be some implementations (44) of the above-described non-transitory storage medium (43) wherein the network entity is the serving gNB for the UE, wherein the serving gNB is one of the base stations in the plurality of base stations.

Therefore, it is intended that claimed subject matter not be limited to the particular examples disclosed, but that such claimed subject matter may also include all aspects falling within the scope of appended claims, and equivalents thereof.

What is claimed is:

1. A method for locating a user equipment (UE) performed by the UE, the method comprising:
    measuring Reference Signal Time Differences (RSTDs) at a first periodic interval for a plurality of base stations in a Radio Access Network (RAN);
    receiving location information from a network entity at a second periodic interval;
    obtaining Round Trip Time (RTT) measurements for the plurality of base stations at the second periodic interval, based on the location information received from the network entity;
    determining Real Time Differences (RTDs) at the second periodic interval for pairs of base stations in the plurality of base stations based on the measured RSTDs and the RTT measurements; and
    determining a location of the UE at the first periodic interval using Observed Time Difference of Arrival (OTDOA) based on the RSTDs and most recent RTDs, wherein the first periodic interval is shorter than the second periodic interval.

2. The method of claim 1, further comprising:
    transmitting uplink (UL) signals at the second periodic interval, wherein the UL signals enable UL Receive Time-Transmission Time (Rx-Tx) measurements by each of the plurality of base stations, wherein the location information is based on the UL Rx-Tx measurements; and performing downlink (DL) Rx-Tx measurements at the second periodic interval of downlink (DL) signals received from each of the plurality of base stations.

3. The method of claim 2, wherein the location information comprises the UL Rx-Tx measurements, and further comprising:

determining the RTT measurements at the second periodic interval based on the UL Rx-Tx measurements and the DL Rx-Tx measurements, wherein obtaining the RTT measurements is based on determining the RTT measurements.

4. The method of claim 2, further comprising:

sending the DL Rx-Tx measurements to the network entity, wherein the DL Rx-Tx measurements enable determination of the RTT measurements by the network entity based on the DL Rx-Tx measurements and the UL Rx-Tx measurements, wherein the location information comprises the RTT measurements, wherein obtaining the RTT measurements is based on receiving the RTT measurements.

5. The method of claim 4, further comprising:

receiving from the network entity a request to send the DL Rx-Tx measurements to the network entity.

6. The method of claim 2, further comprising:

receiving from the network entity or from a serving base station a request to transmit the UL signals at the second periodic interval.

7. The method of claim 2, wherein the UL signals comprise Positioning Reference Signals, Sounding Reference Signals, or both, and wherein the DL signals comprise Positioning Reference Signals, Tracking Reference Signals, or both.

8. The method of claim 1, further comprising:

transmitting a request to the network entity to send the location information to the UE at the second periodic interval, wherein the location information is received in response to the request for the location information.

9. The method of claim 1, wherein the RAN is a Next Generation RAN (NG-RAN) supporting New Radio (NR) wireless access for the UE.

10. The method of claim 9, wherein the network entity is a serving NR Node B (gNB) for the UE, a Location Management Component, a Location Management Function, or a Secure User Plane Location (SUPL) Location Platform.

11. The method of claim 1, further comprising:

determining a rate of change in the RTD for each pair of base stations at the second periodic interval; and for each pair of base stations, determining one of (i) the rate of change in the RTD is above a first threshold and the RTD is not used in the determination of the location of the UE, (ii) the rate of change in the RTD is below the first threshold and above a second threshold and the most recent RTD is determined based on the most recently determined RTD for the pair of base stations and the rate of change in the RTD, or (iii) the rate of change in the RTD is below the second threshold and the most recent RTD is a most recently determined RTD for the pair of base stations.

12. A user equipment (UE) capable of performing location determination of the UE, the UE comprising:

a wireless transceiver configured to wirelessly communicate with base stations in a Radio Access Network (RAN);

at least one memory;

at least one processor coupled to the wireless transceiver and the at least one memory, wherein the at least one processor is configured to:

measure Reference Signal Time Differences (RSTDs) at a first periodic interval of signals received via the wireless transceiver from a plurality of base stations in the Radio Access Network (RAN);

receive, via the wireless transceiver, location information from a network entity at a second periodic interval;

obtain Round Trip Time (RTT) measurements for the plurality of base stations at the second periodic interval, based on the location information received from the network entity;

determine Real Time Differences (RTDs) at the second periodic interval for pairs of base stations in the plurality of base stations based on the measured RSTDs and the RTT measurements; and determine a location of the UE at the first periodic interval using Observed Time Difference of Arrival (OTDOA) based on the RSTDs and most recent RTDs, wherein the first periodic interval is shorter than the second periodic interval.

13. The UE of claim 12, wherein the at least one processor is further configured to:

transmit, via the wireless transceiver, uplink (UL) signals at the second periodic interval, wherein the UL signals enable UL Receive Time-Transmission Time (Rx-Tx) measurements by each of the plurality of base stations, wherein the location information is based on the UL Rx-Tx measurements; and perform downlink (DL) Rx-Tx measurements at the second periodic interval of downlink (DL) signals received via the wireless transceiver from each of the plurality of base stations.

14. The UE of claim 13, wherein the location information comprises the UL Rx-Tx measurements, and the at least one processor is further configured to:

determine the RTT measurements at the second periodic interval based on the UL Rx-Tx measurements and the DL Rx-Tx measurements, wherein obtaining the RTT measurements is based on determining the RTT measurements.

15. The UE of claim 13, wherein the at least one processor is further configured to:

send, via the wireless transceiver, the DL Rx-Tx measurements to the network entity, wherein the DL Rx-Tx measurements enable determination of the RTT measurements by the network entity based on the DL Rx-Tx measurements and the UL Rx-Tx measurements, wherein the location information comprises the RTT measurements, wherein obtaining the RTT measurements is based on receiving the RTT measurements.

16. The UE of claim 15, wherein the at least one processor is further configured to:

receive, via the wireless transceiver, from the network entity a request to send the DL Rx-Tx measurements to the network entity.

17. The UE of claim 13, wherein the at least one processor is further configured to:

receive, via the wireless transceiver, from the network entity or from a serving base station a request to transmit the UL signals at the second periodic interval.

18. The UE of claim 13, wherein the UL signals comprise Positioning Reference Signals, Sounding Reference Signals, or both, and wherein the DL signals comprise Positioning Reference Signals, Tracking Reference Signals, or both.

19. The UE of claim 12, wherein the at least one processor is further configured to:
transmit, via the wireless transceiver, a request to the network entity to send the location information to the UE at the second periodic interval, wherein the location information is received in response to the request for the location information.

20. The UE of claim 12, wherein the RAN is a Next Generation RAN (NG-RAN) supporting New Radio (NR) wireless access for the UE.

21. The UE of claim 20, wherein the network entity is a serving NR Node B (gNB) for the UE, a Location Management Component, a Location Management Function, or a Secure User Plane Location (SUPL) Location Platform.

22. The UE of claim 12, wherein the at least one processor is further configured to:
determine a rate of change in the RTD for each pair of base stations at the second periodic interval; and
for each pair of base stations, determine one of (i) the rate of change in the RTD is above a first threshold and the RTD is not used in the determination of the location of the UE, (ii) the rate of change in the RTD is below the first threshold and above a second threshold and the most recent RTD is determined based on the most recently determined RTD for the pair of base stations and the rate of change in the RTD, or (iii) the rate of change in the RTD is below the second threshold and the most recent RTD is a most recently determined RTD for the pair of base stations.

23. A user equipment (UE) capable of performing location determination of the UE, the UE comprising:
means for measuring Reference Signal Time Differences (RSTDs) at a first periodic interval for a plurality of base stations in a Radio Access Network (RAN);
means for receiving location information from a network entity at a second periodic interval;
means for obtaining Round Trip Time (RTT) measurements for the plurality of base stations at the second periodic interval, based on the location information received from the network entity;
means for determining Real Time Differences (RTDs) at the second periodic interval for pairs of base stations in the plurality of base stations based on the measured RSTDs and the RTT measurements; and
means for determining a location of the UE at the first periodic interval using Observed Time Difference of Arrival (OTDOA) based on the RSTDs and most recent RTDs, wherein the first periodic interval is shorter than the second periodic interval.

24. The UE of claim 23, further comprising:
means for transmitting uplink (UL) signals at the second periodic interval, wherein the UL signals enable UL Receive Time-Transmission Time (Rx-Tx) measurements by each of the plurality of base stations, wherein the location information is based on the UL Rx-Tx measurements; and
means for performing downlink (DL) Rx-Tx measurements at the second periodic interval of downlink (DL) signals received from each of the plurality of base stations.

25. The UE of claim 24, wherein the location information comprises the UL Rx-Tx measurements, and further comprising:
means for determining the RTT measurements at the second periodic interval based on the UL Rx-Tx measurements and the DL Rx-Tx measurements, wherein obtaining the RTT measurements is based on determining the RTT measurements.

26. The UE of claim 24, further comprising:
means for sending the DL Rx-Tx measurements to the network entity, wherein the DL Rx-Tx measurements enable determination of the RTT measurements by the network entity based on the DL Rx-Tx measurements and the UL Rx-Tx measurements, wherein the location information comprises the RTT measurements, wherein obtaining the RTT measurements is based on receiving the RTT measurements.

27. The UE of claim 24, further comprising:
means for receiving from the network entity or from a serving base station a request to transmit the UL signals at the second periodic interval.

28. The UE of claim 27, further comprising:
means for receiving from the network entity a request to send the DL Rx-Tx measurements to the network entity.

29. The UE of claim 24, wherein the UL signals comprise Positioning Reference Signals, Sounding Reference Signals, or both, and wherein the DL signals comprise Positioning Reference Signals, Tracking Reference Signals, or both.

30. The UE of claim 23, further comprising:
means for transmitting a request to the network entity to send the location information to the UE at the second periodic interval, wherein the location information is received in response to the request for the location information.

31. The UE of claim 23, wherein the RAN is a Next Generation RAN (NG-RAN) supporting New Radio (NR) wireless access for the UE.

32. The UE of claim 31, wherein the network entity is a serving NR Node B (gNB) for the UE, a Location Management Component, a Location Management Function, or a Secure User Plane Location (SUPL) Location Platform.

33. The UE of claim 23, further comprising:
means for determining a rate of change in the RTD for each pair of base stations at the second periodic interval; and
for each pair of base stations, determining one of (i) the rate of change in the RTD is above a first threshold and the RTD is not used in the determination of the location of the UE, (ii) the rate of change in the RTD is below the first threshold and above a second threshold and the most recent RTD is determined based on the most recently determined RTD for the pair of base stations and the rate of change in the RTD, or (iii) the rate of change in the RTD is below the second threshold and the most recent RTD is a most recently determined RTD for the pair of base stations.

34. A non-transitory storage medium including program code stored thereon, the program code is operable to cause at least one processor in a user equipment (UE) to perform location determination for the UE, comprising:
program code to measure Reference Signal Time Differences (RSTDs) at a first periodic interval for a plurality of base stations in a Radio Access Network (RAN);
program code to receive location information from a network entity at a second periodic interval;

program code to obtain Round Trip Time (RTT) measurements for the plurality of base stations at the second periodic interval, based on the location information received from the network entity;

program code to determine Real Time Differences (RTDs) at the second periodic interval for pairs of base stations in the plurality of base stations based on the measured RSTDs and the RTT measurements; and program code to determine a location of the UE at the first periodic interval using Observed Time Difference of Arrival (OTDOA) based on the RSTDs and most recent RTDs, wherein the first periodic interval is shorter than the second periodic interval.

35. The non-transitory storage medium of claim 34, further comprising:

program code to transmit uplink (UL) signals at the second periodic interval, wherein the UL signals enable UL Receive Time-Transmission Time (Rx-Tx) measurements by each of the plurality of base stations, wherein the location information is based on the UL Rx-Tx measurements; and program code to perform downlink (DL) Rx-Tx measurements at the second periodic interval of downlink (DL) signals received from each of the plurality of base stations.

36. The non-transitory storage medium of claim 35, wherein the location information comprises the UL Rx-Tx measurements, and further comprising:

program code to determine the RTT measurements at the second periodic interval based on the UL Rx-Tx measurements and the DL Rx-Tx measurements, wherein obtaining the RTT measurements is based on determining the RTT measurements.

37. The non-transitory storage medium of claim 35, further comprising:

program code to send the DL Rx-Tx measurements to the network entity, wherein the DL Rx-Tx measurements enable determination of the RTT measurements by the network entity based on the DL Rx-Tx measurements and the UL Rx-Tx measurements, wherein the location information comprises the RTT measurements, wherein obtaining the RTT measurements is based on receiving the RTT measurements.

38. The non-transitory storage medium of claim 35, further comprising:

program code to receive from the network entity or from a serving base station a request to transmit the UL signals at the second periodic interval.

39. The non-transitory storage medium of claim 38, further comprising:

program code to receive from the network entity a request to send the DL Rx-Tx measurements to the network entity.

40. The non-transitory storage medium of claim 34, further comprising:

program code to transmit a request to the network entity to send the location information to the UE at the second periodic interval, wherein the location information is received in response to the request for the location information.

41. The non-transitory storage medium of claim 35, wherein the UL signals comprise Positioning Reference Signals, Sounding Reference Signals, or both, and wherein the DL signals comprise Positioning Reference Signals, Tracking Reference Signals, or both.

42. The non-transitory storage medium of claim 34, wherein the RAN is a Next Generation RAN (NG-RAN) supporting New Radio (NR) wireless access for the UE.

43. The non-transitory storage medium of claim 42, wherein the network entity is a serving NR Node B (gNB) for the UE, a Location Management Component, a Location Management Function, or a Secure User Plane Location (SUPL) Location Platform.

44. The non-transitory storage medium of claim 34, further comprising:

program code to determine a rate of change in the RTD for each pair of base stations at the second periodic interval; and for each pair of base stations, determining one of (i) the rate of change in the RTD is above a first threshold and the RTD is not used in the determination of the location of the UE, (ii) the rate of change in the RTD is below the first threshold and above a second threshold and the most recent RTD is determined based on the most recently determined RTD for the pair of base stations and the rate of change in the RTD, or (iii) the rate of change in the RTD is below the second threshold and the most recent RTD is a most recently determined RTD for the pair of base stations.

* * * * *